(12) United States Patent
Matsumoto

(10) Patent No.: US 7,200,080 B2
(45) Date of Patent: Apr. 3, 2007

(54) OPTICAL DISK RECORDER WITH REPRODUCTION QUALITY CONTROL

(75) Inventor: Keishi Matsumoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 374 days.

(21) Appl. No.: 10/341,675

(22) Filed: Jan. 14, 2003

(65) Prior Publication Data

US 2003/0133376 A1 Jul. 17, 2003

(30) Foreign Application Priority Data

Jan. 16, 2002 (JP) .............................. 2002-007736
Jan. 25, 2002 (JP) .............................. 2002-017401

(51) Int. Cl.
*G11B 7/0045* (2006.01)
(52) U.S. Cl. ................................. 369/47.12; 369/53.35
(58) Field of Classification Search ............ 369/47.12, 369/47.13, 47.53, 53.35
See application file for complete search history.

(56) References Cited

U.S. PATENT DOCUMENTS

| 6,556,524 B1* | 4/2003 | Takeshita .................. 369/47.43 |
| 6,865,552 B1* | 3/2005 | Inoue et al. .................... 705/57 |
| 2002/0181365 A1* | 12/2002 | Nakajo ..................... 369/47.53 |
| 2003/0035355 A1* | 2/2003 | Morishima ................ 369/47.53 |
| 2003/0048711 A1* | 3/2003 | Hirai ........................ 369/47.39 |
| 2003/0076759 A1* | 4/2003 | Yu .............................. 369/53.1 |
| 2003/0081519 A1* | 5/2003 | Harada ....................... 369/53.3 |
| 2004/0022166 A1* | 2/2004 | Shoji et al. ................. 369/125 |

FOREIGN PATENT DOCUMENTS

| JP | 56022231 | 3/1981 |
| JP | 2000182244 | 6/2000 |

OTHER PUBLICATIONS

Notice of Rejection, Dispatch date: Jan. 25, 2005 (2-pages).

* cited by examiner

*Primary Examiner*—Andrea Wellington
*Assistant Examiner*—Lixi Chow
(74) *Attorney, Agent, or Firm*—Pillsbury Winthrop Shaw Pittman LLP

(57) ABSTRACT

A method is designed for writing data originally recorded in a source disk medium with an original reproduction signal quality, into an object disk medium by means of an optical recording apparatus having a machine parameter settable to control a reproduction signal quality of data. The method is carried out by the steps of measuring the original reproduction signal quality of the data originally recorded in the source disk medium, setting a value of the machine parameter of the optical recording apparatus in accordance with the measured original reproduction signal quality, and writing the data into the object disk medium by means of the optical recording apparatus so as to secure the reproduction signal quality of the written data comparable to the original reproduction signal quality.

10 Claims, 12 Drawing Sheets

FIG.4 (A)
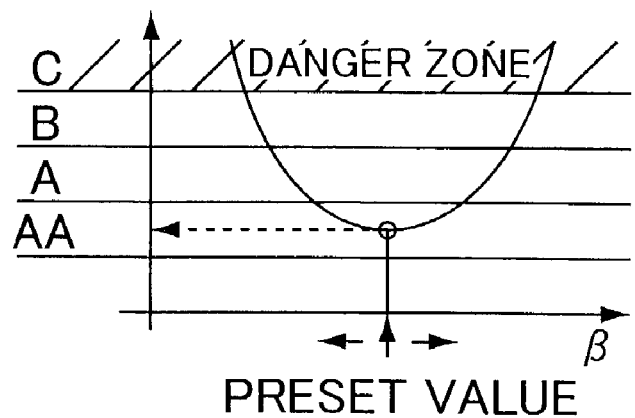
FIG.4 (B)
| $\beta$ | JUDGEMENT |
|---|---|
| -20 | C |
| -15 | C |
| -10 | B |
| -5 | A |
| 0 | AA |
| -15 | B |
| ⋮ | ⋮ |
FIG.4 (C)
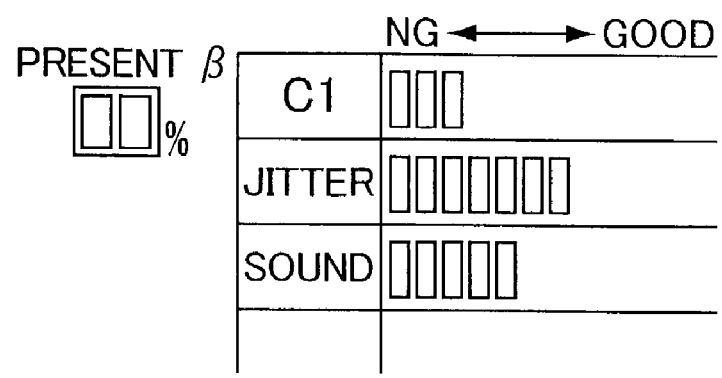

FIG.7

| | | AUDIO-ORIENTED | | COMPUTER-DATA ORIENTED | |
|---|---|---|---|---|---|
| MEDIA A | 1x SPEED | STRATEGY A | $\beta$ :+3 | STRATEGY A | $\beta$ :+5 |
| | 2x SPEED | STRATEGY B | $\beta$ :+2 | STRATEGY A | $\beta$ :+5 |
| | 4x SPEED | STRATEGY A | $\beta$ :−1 | STRATEGY A | $\beta$ :+4 |
| | ⋮ | ⋮ | ⋮ | ⋮ | ⋮ |
| MEDIA B | 1x SPEED | STRATEGY C | $\beta$ :+2 | STRATEGY B | $\beta$ :+3 |
| | 2x SPEED | STRATEGY B | $\beta$ :−1 | STRATEGY B | $\beta$ :+3 |
| | ⋮ | ⋮ | ⋮ | ⋮ | ⋮ |

| | JITTER | C1 ERROR | $\beta$ | SOUND QUALITY |
|---|---|---|---|---|
| 1x SPEED | 25 | 0 | +5 | AA |
| 2x SPEED | 28 | 0 | +2 | A |
| ⋮ | | | | |
| 12x SPEED | 30 | 10 | 0 | B |
| 16x SPEED | 33 | 40 | −3 | C |
| ⋮ | | | | |

OPTICAL DISK RECORDER WITH REPRODUCTION QUALITY CONTROL

BACKGROUND OF THE INVENTION

1. Technical Field of the Invention

The present invention relates to adjustment of reproduction signal quality of data which is recorded on write once optical disks and erasable optical disks.

2. Prior Art

Optical disks are used for recording, reproducing, and backing up audio or music data, computer data, image or still picture data, motion picture data, and the like. This is because optical disks can record a large amount of data in addition to the spread of low price optical disks and optical disk recording apparatuses capable of recording data as well as data recording software and computers. Optical disks capable of recording data include write once optical disks such as CD-R and DVD-R that can record data only once; and erasable optical disks such as CD-RW, DVD-RW, DVD+RW, and DVD-RAM that can rewrite data. An optical disk recording apparatus for recording dada on optical disks automatically provides optimal values of machine parameters such as Write Strategy associated with the reproduction signal quality of recorded data. Occasionally, the conventional optical recording apparatus may automatically set an improper machine parameter. When using such an optical disk recording apparatus, a user can determine whether or not to enable adjusting the function of automatically decreasing an improper recording speed to a possibly workable level.

It is known that the sound quality slightly changes when music data on a pressed CD (such as a CD-DA manufactured by a stamper) is copied to the above-mentioned recordable optical disk. Since the optical disk records digital music data, there seems no difference in the sound quality between the original music data and the copied data. Actually, however, the music data causes a different sound quality perceivable by specialists or experienced listeners due to change of reproduction signal qualities such as a β value and a jitter.

Presently, though it is not clearly known why this difference occurs, it is known that the sound quality changes with a machine parameter related to the reproduction signal quality.

The conventional optical disk recording apparatus automatically provides optimal parameter values as mentioned above. Accordingly, the same optimal parameter is used to record data irrespectively of whether an optical disk records, e.g., music data or computer data. Though the optimal parameter is defined for the best effort to prevent an error during data reproduction, the parameter does not always ensure the best sound quality for music data recording. In order to provide good sound quality for reproduction of music data recorded on the optical disk, it is necessary to define an optimal parameter for music data independently of that for computer data.

When the conventional optical disk recording apparatus records data on an optical disk, however, a user cannot set a parameter for representing the reproduction signal quality of recorded data. When music data is recorded on a CD-R disk, for example, there has not been available parameter settings such as customizing the β value in order to improve the sound quality of reproduced music data. Such a design allows beginners to easily record data on optical disks, but has been unsatisfactory for advanced users because there is no way of customizing a parameter representing the reproduction signal quality.

Since optical disk materials (particularly for the recording layer) vary with types, manufacturers, models, and the like, the Write Strategy and recording speed settings for the optical disk recording apparatus also vary accordingly. When music data on a pressed CD is copied to a CD-R, sounds reproduced from the pressed CD and the CD-R may cause different sound qualities.

Further, depending on manufacturing periods, models, and the like, recordable optical disks are designed for different maximum possible recording speeds and different recording speeds capable of recording with the best signal quality. For example, an earlier model optical disk provides a low maximum recordable speed and uses a relatively thick recording film, making it possible to record data at low-speed areas such as 1× speed (normal speed) and 2× speed (double speed). By contrast, a recent model optical disk provides a high maximum recordable speed and uses a relatively thin recording film, making it possible to record data at high-speed ranges such as 4× speed (four times speed) and 8× speed (eight times speed). When the optical disk is incompatible with a recording speed inadvertently set by a user, some optical disk recording apparatuses have a function of automatically adjust the current recording speed to the maximum recording speed congruent with the optical disk. However, the adjusted maximum recording speed is based on the signal quality limit, not on the criterion of selecting a recording speed for good sound quality with reduced jitter, for example. Accordingly, the recording speed automatically set by this function does not necessarily ensure good sound quality for recording music data. This function specification has been unsatisfactory for some users such as experienced listeners who wish good sound quality.

To cope with this problem, for example, an experienced listener purchases an optical disk recording apparatus suitable for music data recording. The listener also purchases an optical disk that is compatible with such an optical disk recording apparatus and that is capable of recording music data with good sound quality. Further, he or she needs to adjust an optimal write speed for each of the selected optical disks. These works impose users with many costs and labors.

When a CD-R disk is recorded on the optical disk recording apparatus, that CD-R disk is not always reproduced on the same optical disk recording apparatus, but may be reproduced on a different CD player. In such a case, good reproduction signal quality on the optical disk recording apparatus does not necessarily mean good reproduction sound quality on another CD player.

SUMMARY OF THE INVENTION

The present invention has been made in consideration of the foregoing. It is therefore an object of the present invention to provide an optical disk recording method, an optical disk recording apparatus, and an optical disk recording program capable of manually or automatically adjusting reproduction signal quality in accordance with nature of data to be recorded.

As means for solving the above-mentioned problems, the present invention has the following configurations.

(1) In a conceptual sense, the inventive method is designed for recording data onto a recordable optical disk based on a parameter, the inventive method comprising the steps of providing a relation between a signal quality of data recorded on an optical disk and a parameter related to the signal quality, measuring a signal quality of original data originally recorded on a source optical disk, setting a parameter according to the measured signal quality based on the provided relation between the signal quality and the parameter, and copying the original data onto a recordable optical disk based on the set parameter such that the signal quality of the data copied on the recordable optical disk is substantially the same as the signal quality of the original data.

In a practical sense, the inventive method is designed for writing data originally recorded in a source disk medium with an original reproduction signal quality, into an object disk medium by means of an optical recording apparatus having a machine parameter settable to control a reproduction signal quality of data. The method comprises the steps of measuring the original reproduction signal quality of the data originally recorded in the source disk medium, setting a value of the machine parameter of the optical recording apparatus in accordance with the measured original reproduction signal quality, and writing the data into the object disk medium by means of the optical recording apparatus so as to secure the reproduction signal quality of the written data comparable to the original reproduction signal quality.

According to this configuration, the present invention measures a reproduction signal quality of data recorded on a source optical disk, sets a machine parameter concerning reproduction signal qualities based on the measured reproduction signal quality, and writes data recorded on the source optical disk onto an object recordable optical disk so as to achieve almost the same reproduction signal quality as that of the data recorded on the source optical disk. Accordingly, when copying music data from a pressed CD to a CD-R, for example, a user can copy music data to the CD-R with almost the same reproduction signal quality as that of the pressed CD which is a copy origin. There is no possibility of a conventional problem of reproducing a different sound quality due to a different signal quality. It becomes possible to reproduce music data with almost the same sound quality as that for the source optical disk.

Signal quality parameters representing the reproduction signal quality include not only the β value and the asymmetry, but also an HF modulation factor, HF amplitude, HF reflectance, average reflectance, crosstalk, jitter, deviation, and effective length. When measuring the signal quality of music data, it is a good practice to measure one or more of these signal quality parameters to set the machine parameter.

Machine parameters associated with the reproduction signal quality for data recording determine the reproduction signal quality of data that is recorded on an optical disk. For example, such parameters include a recording speed, write strategy, laser power irradiated to an optical disk during data recording, a target β value for OPC or running OPC, focus balance, and tracking balance.

(2) The inventive method is designed for writing data originally recorded in a source disk medium with an original reproduction signal quality, into an object disk medium by means of an optical recording apparatus. The inventive method comprises the steps of provisionally storing a relation between a machine parameter settable to the optical recording apparatus and a reproduction signal quality of data written by the optical recording apparatus, measuring the original reproduction signal quality of the data originally recorded in the source disk medium, setting a value of the machine parameter of the optical recording apparatus in matching with the measured original reproduction signal quality based on the provisionally stored relation between the machine parameter and the reproduction signal quality, and writing the data into the object disk medium by means of the optical recording apparatus with the set machine parameter so as to secure the reproduction signal quality of the written data comparable to the original reproduction signal quality.

According to this configuration, the present invention previously stores relationship between a reproduction signal quality of data recorded on an optical disk and a machine parameter concerning reproduction signal qualities, measures a reproduction signal quality of data recorded on a source optical disk, sets a machine parameter concerning signal qualities based on the measured reproduction signal quality and the relationship between the reproduction signal quality and the machine parameter, and records data on a recordable optical disk so as to achieve almost the same reproduction signal quality as the data recorded on the source optical disk. Accordingly, when copying music data from a pressed CD to a CD-R, for example, a user can copy music data to the CD-R with almost the same reproduction signal quality as that of the pressed CD as a copy origin based on the relationship between the stored reproduction signal quality and the machine parameter concerning reproduction signal qualities. There is no possibility of a conventional problem of reproducing a different sound quality due to a different signal quality. It becomes possible to reproduce music data with almost the same sound quality as that of the source optical disk.

(3) The inventive method is designed for writing data originally recorded in a source disk medium with an original reproduction signal quality, into an object disk medium by means of an optical recording apparatus having a machine parameter. The inventive method comprises the steps of conducting a provisional write of test data into the object disk medium by means of the optical recording apparatus, an analysis of a reproduction signal quality of the test data written in the object disk medium, and a determination of a relation between the analyzed reproduction signal quality and the machine parameter of the optical recording apparatus used in the provisional write, measuring the original reproduction signal quality of the data originally recorded in the source disk medium, setting a value of the machine parameter of the optical recording apparatus in matching with the measured original reproduction signal quality based on the determined relation between the machine parameter and the reproduction signal quality, and writing the data into the object disk medium by means of the optical recording apparatus with the set machine parameter so as to secure the reproduction signal quality of the written data comparable to the original reproduction signal quality.

According to this configuration, the present invention measures a reproduction signal quality of data recorded on a source optical disk, previously finds relationship between a reproduction signal quality and a machine parameter concerning reproduction signal qualities from a reproduction signal quality of data test-recorded on a recordable optical disk, sets a machine parameter concerning reproduction signal qualities based on the measured reproduction signal quality of the copy source and the relationship between a reproduction signal quality and a machine parameter, and records data from a source optical disk onto a recordable optical disk so as to achieve almost the same reproduction signal quality as that of the data recorded on the source optical disk. Accordingly, when copying music data from a pressed CD to a CD-R, for example, a user can actually find relationship between a reproduction signal quality and a machine parameter concerning reproduction signal qualities by the provisional test writing, and then copy music data to the CD-R with almost the same reproduction signal quality as that of the pressed CD as a copy origin. There is no possibility of a conventional problem of reproducing a different sound quality due to a different signal quality. It becomes possible to reproduce music data with almost the same sound quality as that for the source optical disk.

(4) The inventive method is designed for recording data of various types in an optical disk medium with a given reproduction signal quality by means of an optical recording apparatus having a machine parameter relating to the reproduction signal quality of the data. The inventive method comprises the steps of obtaining information specifying a type of the data to be recorded in the optical recording apparatus, changing a value of the machine parameter of the optical recording apparatus in accordance with the specified type of the data, and writing the data into the optical disk medium by means of the optical recording apparatus so that the reproduction signal quality of the written data is made in conformity with the specified type of the data.

According to this configuration, the present invention selects and sets machine parameters concerning reproduction signal qualities of recorded data according to types of data recorded on an optical disk when data is to be recorded on an recordable optical disk. Consequently, it is possible to obtain data with good reproduction signal quality corresponding to the data type.

(5) The inventive method is designed for recording data in an optical disk medium with a certain reproduction signal quality by means of an optical recording apparatus operative according to a parameter relating to the reproduction signal quality of the data. The inventive method comprises the steps of setting the optical recording apparatus such as to vary a value of the parameter along a time during operation of the optical recording apparatus, and writing the data into the optical disk medium by means of the optical recording apparatus so that the reproduction signal quality of the written data is made variable along a time according to the setting of the optical recording apparatus.

According to this configuration, the present invention records data on a recordable optical disk so that during the reproducing of the recorded data, the reproduction signal quality varies as desired manner. When original data is music data, the sound quality can be configured to differ from that of the original data, thereby making new audibility available.

(6) The inventive method is designed for recording data of various types into an optical disk medium with a certain reproduction signal quality by means of an optical recording apparatus at a certain recording speed. The inventive method comprises the steps of providing a relation between a level of the reproduction signal quality and a value of the recording speed with respect to the various types of data, setting a value of the recording speed based on the provided relation in accordance with a type of the data to be recorded, and recording the data into the optical disk medium by means of the optical recording apparatus at the set recording speed to thereby secure an optimum level of the reproduction signal quality for the type of the data.

According to this configuration, the present invention previously stores relationship between a reproduction signal quality of recorded data and a recording speed according to optical disk types or relationship among a reproduction signal quality, a recording speed, and a data type. Alternatively, the inventive method test-writes data on a recordable optical disk and stores relationship between a reproduction signal quality of recorded data and a recording speed according to a reproduction signal quality of the data test-written on the recordable optical disk or relationship among a reproduction signal quality, a recording speed, and a data type. Then the inventive method selects and sets a recording speed causing an optimum reproduction signal quality in accordance with the relationship between the reproduction signal quality and the recording speed or the relationship among the reproduction signal quality, the recording speed, and the data type, and records data on a recordable optical disk by the set recording speed. Consequently, it becomes possible to perform optimum data recording in accordance with the disk types.

(7) In a conceptual sense, the inventive optical recording apparatus is designed for recording data onto a recordable optical disk based on a parameter. The inventive optical recording apparatus comprises a providing section that provides a relation between a signal quality of data recorded on an optical disk and a parameter related to the signal quality, a measuring section that measures a signal quality of original data originally recorded on a source optical disk, a setting section that sets a parameter according to the measured signal quality based on the provided relation between the signal quality and the parameter, and a writing section that copies the original data onto a recordable optical disk based on the set parameter such that the signal quality of the data copied on the recordable optical disk is substantially the same as the signal quality of the original data.

In a practical sense, the inventive optical recording apparatus is designed for writing data into an object disk medium under a machine parameter settable to control a reproduction signal quality of the data, which is originally recorded in a source disk medium with an original reproduction signal quality. The inventive optical recording apparatus comprises a measuring section that measures the original reproduction signal quality of the data originally recorded in the source disk medium, a setting section that sets a value of the machine parameter in accordance with the measured original reproduction signal quality, and a writing section that writes the data into the object disk medium so as to secure the reproduction signal quality of the written data comparable to the original reproduction signal quality.

According to this configuration, the measuring section measures reproduction signal qualities of data recorded on a source optical disk, the setting section sets a machine parameter concerning reproduction signal qualities and adjusts a reproduction signal quality of the data to be recorded on a recordable optical disk to almost the same as that of data recorded on the source optical disk, and the data writing section records the recorded data. Therefore, the same effect as (1) can be obtained.

(8) The inventive optical recording apparatus is designed for writing data into an object disk medium under a machine parameter settable to control a reproduction signal quality of the data, which is originally recorded in a source disk medium with an original reproduction signal quality. The inventive optical recording apparatus comprises a storing section that provisionally stores a relation between the machine parameter and the reproduction signal quality, a measuring section that measures the original reproduction signal quality of the data originally recorded in the source disk medium, a setting section that sets a value of the machine parameter in matching with the measured original reproduction signal quality based on the provisionally stored relation between the machine parameter and the reproduction signal quality, and a writing section that writes the data into the object disk medium under the set machine parameter so as to secure the reproduction signal quality of the written data comparable to the original reproduction signal quality.

According to this configuration, the storing section stores relationship between a reproduction signal quality of data recorded on an optical disk and a machine parameter concerning reproduction signal qualities, the signal quality measuring section measures a reproduction signal quality of data recorded on a source optical disk, the setting section sets a machine parameter concerning reproduction signal qualities based on the relationship between a reproduction signal quality and a machine parameter and based on the measured reproduction signal quality of the copy origin and provides adjustment so as to achieve almost the same reproduction signal quality as that of the data recorded on the source optical disk, and the data writing section records the recorded data from the copy origin to a recordable optical disk. Therefore, the same effect as (2) can be obtained.

(9) The inventive optical recording apparatus is designed for writing data into an object disk medium under a machine parameter settable to control a reproduction signal quality of the data, which is originally recorded in a source disk medium with an original reproduction signal quality. The optical recording apparatus comprises a test section that conducts a provisional write of test data into the object disk medium, an analysis of a reproduction signal quality of the test data written in the object disk medium, and a determination of a relation between the analyzed reproduction signal quality and the machine parameter used in the provisional write, a measuring section that measures the original reproduction signal quality of the data originally recorded in the source disk medium, a setting section that sets a value of the machine parameter in matching with the measured original reproduction signal quality based on the determined relation between the machine parameter and the reproduction signal quality, and a writing section that writes the data into the object disk medium under the set machine parameter so as to secure the reproduction signal quality of the written data comparable to the original reproduction signal quality.

According to this configuration, the signal quality measuring section measures a reproduction signal quality of data recorded on a source optical disk, the test section performs test writing on a recordable optical disk and finds relationship between a reproduction signal quality and a machine parameter concerning reproduction signal qualities from a reproduction signal quality of test-written data, the setting section sets a machine parameter concerning reproduction signal qualities based on the measured reproduction signal quality of the copy origin and the relationship between a reproduction signal quality and a machine parameter and provides adjustment so as to achieve almost the same reproduction signal quality as that of the data recorded on the source optical disk, and the data writing section writes the original data from the copy origin to a recordable optical disk. Therefore, the same effect as (3) can be obtained.

(10) The inventive optical recording apparatus is designed for writing data into an optical disk medium and is operable under a quality parameter representing a reproduction signal quality of the written data. The inventive optical recording apparatus comprises an input section that inputs a desired value of the quality parameter, a setting section that sets the inputted value into the quality parameter, and a writing section that writes data into the object disk medium under the set quality parameter to thereby secure a desired level of the reproduction signal quality of the written data in accordance with the inputted value of the quality parameter.

According to this configuration, the input section enters a signal quality parameter indicating a reproduction signal quality of recorded data, and the setting section sets a machine parameter according to a value entered from the input section. Consequently, the signal quality can be set to any value and a user can obtain an intended signal quality. If there is a difference in capabilities of a recording apparatus and a reproduction apparatus, it is possible to provide the reproduction apparatus with an optimum signal quality.

(11) The inventive optical recording apparatus is designed for recording data of various types in an optical disk medium with a given reproduction signal quality and is operative under a machine parameter relating to the reproduction signal quality of the data. The inventive optical recording apparatus comprises a discriminating section that discriminates a type of the data to be recorded in the optical disk medium, a setting section that changes a value of the machine parameter in accordance with the discriminated type of the data, and a writing section that writes the data into the optical disk medium so that the reproduction signal quality of the written data is made associative with the discriminated type of the data.

According to this configuration, the discriminating section identifies a type of data to be recorded on an optical disk, the setting section selects and sets machine parameters concerning reproduction signal qualities of data to be recorded on an optical disk in accordance with an identification result of the discriminating section, and the data writing section records the recorded data on a recordable optical disk. Therefore, the same effect as (4) can be obtained.

(12) The inventive optical recording apparatus is designed for recording data in an optical disk medium with a certain reproduction signal quality and is operative according to a machine parameter relating to the reproduction signal quality of the data. The inventive optical recording apparatus comprises a setting section that sets the machine parameter such as to vary a value thereof along a time during operation of the optical recording apparatus, and a writing section that writes the data into the optical disk medium so that the reproduction signal quality of the written data is made variable along a time according to the setting of the machine parameter of the optical recording apparatus.

According to this configuration, the setting section adjusts a machine parameter concerning reproduction signal qualities so that variation or fluctuation occurs in a reproduction signal quality of recorded data, and the data writing section records data on a recordable optical disk based on the adjusted machine parameter. Therefore, the same effect as (5) can be obtained.

(13) The inventive optical recording apparatus is designed for recording data of various types into an optical disk medium with a certain reproduction signal quality at a certain recording speed. The inventive optical recording apparatus comprises a storing section that stores a relation between a level of the reproduction signal quality and a value of the recording speed with respect to the various types of data, a setting section that sets a value of the recording speed based on the stored relation in accordance with a type of the data to be recorded, and a writing section that records the data into the optical disk medium at the set recording speed to thereby secure an optimum level of the reproduction signal quality for the type of the data.

According to this configuration, the storing section previously stores relationship between a reproduction signal quality of recorded data and a recording speed according to optical disk types or relationship among a reproduction signal quality, a recording speed, and a data type, or the storing section test-writes data on a recordable optical disk and stores relationship between a reproduction signal quality of recorded data and a recording speed according to a reproduction signal quality of the data test-written on the recordable optical disk or relationship among a reproduction signal quality, a recording speed, and a data type. The setting section selects and sets a recording speed causing an optimum reproduction signal quality in accordance with the relationship between the reproduction signal quality and the recording speed or the relationship among the reproduction signal quality, the recording speed, and the data type. The data writing section records data on a recordable optical disk at the set recording speed. Therefore, the same effect as (6) can be obtained.

(14) The inventive optical recording apparatus comprises a writing section capable of writing data into an optical disk medium with a certain reproduction signal quality of the written data, an estimating section operable before the writing of the data for estimating the reproduction signal quality, and a display section that displays the estimated reproduction signal quality which will be expected when the data is actually written into the optical disk medium.

According to this configuration, the estimating section estimates a reproduction signal quality when data is recorded on the recordable optical disk, and the display section displays the estimated reproduction signal quality. Consequently, a user is notified of an estimated value for the reproduction signal quality of the recorded data before user data is recorded. Depending on the displayed signal quality, it is possible to replace the optical disk with a different one and select another recordable optical disk with better reproduction signal quality.

(15) The inventive optical recording apparatus comprises a writing section capable of writing data into an optical disk of various types under a given machine parameter relating to a reproduction signal quality of the written data, a storing section that stores a relation between the machine parameter and the reproduction signal quality, a detecting section that detects a type of the optical disk medium to be used for writing of data, an estimating section operable before the writing of the data for estimating the reproduction signal quality based on the stored relation between the machine parameter and the reproduction signal quality and the detected type of the optical disk medium, and a display section that displays the estimated reproduction signal quality which will be expected when the data is actually written into the optical disk medium of the detected type.

According to this configuration, the storing section stores relationship between a reproduction signal quality of data recorded on an optical disk and a machine parameter concerning reproduction signal qualities, the detecting section identifies a recordable optical disk type, the estimating section estimates a reproduction signal quality based on the stored information and the identification result when data is recorded on a recordable optical disk, and the display section displays the estimated reproduction signal quality. Consequently, a user is notified of an estimated reproduction signal quality of data to be recorded on a recordable optical disk. Depending on the displayed signal quality, it is possible to replace the optical disk with a different one and select a recordable optical disk with better reproduction signal quality.

(16) The inventive optical recording apparatus comprises a writing section capable of writing data into an optical disk of various types with a certain reproduction signal quality of the written data, a test section that enables the writing section to conduct provisional writing of test data into the optical disk medium and that measures a reproduction signal quality of the written test data, a detecting section that detects a type of the optical disk medium subjected to the provisional writing of the test data, an estimating section operable before the writing of the data for estimating the reproduction signal quality based on the measured reproduction signal quality of the test data and the detected type of the optical disk medium, and a display section that displays the estimated reproduction signal quality which will be expected when the data is actually written into the detected type of the optical disk medium.

According to this configuration, the detecting section identifies a recordable optical disk type, the test section measures a reproduction signal quality from reproduction signal qualities of data test-written on a recordable optical disk, the estimating section estimates a reproduction signal quality based on the identification result and the measurement result when data is recorded on a recordable optical disk, and the display section displays an estimated reproduction signal quality. Consequently, a user is notified of an estimated reproduction signal quality of data to be recorded on a recordable optical disk. Depending on the displayed signal quality, it is possible to replace the optical disk with a different one and select a recordable optical disk with better reproduction signal quality.

(17) The inventive optical recording apparatus is designed for recording data into an optical disk medium with a certain reproduction signal quality. The inventive optical recording apparatus comprises a storing section that stores a plurality of quality parameters which have been used for recording data in the past, and which represent the reproduction signal qualities of the data recorded in the past, a display section that displays the stored quality parameters, a selecting section that selects one of the displayed quality parameters, a setting section that sets a machine parameter relating to the reproduction signal quality in accordance with the selected quality parameter, and a writing section operable under the set machine parameter for recording the data into the optical disk medium.

According to this configuration, the storing section stores a signal quality parameter indicating a signal quality defined when data is recorded on an optical disk, the selecting section selects the parameter which is displayed on the display section and is stored by the storing section, and the setting section sets a machine parameter during data recording based on a value selected by the selecting section. Consequently, the present invention is configured to read a reproduction signal quality parameter defined when data was recorded on an optical disk, and to easily record data on a recordable optical disk so as to achieve the equivalent reproduction signal quality.

(18) The inventive computer program is designed for use in an optical recording apparatus having a CPU and being capable of writing data into an optical disk medium of various types with a certain reproduction signal quality of the written data, wherein the computer program is executable by the CPU for causing the optical recording apparatus to perform a process comprising the steps of discriminating a type of the optical disk medium to be used for writing of data, estimating the reproduction signal quality according to the discriminated type of the optical disk medium before the writing of the data, and displaying the estimated reproduction signal quality which will be expected when the data is actually written into the optical disk medium of the discriminated type.

According to this configuration, the inventive program allows the computer to perform the process such that the estimating step estimates a reproduction signal quality when data is recorded on a recordable optical disk, and the display step displays the estimated reproduction signal quality. Therefore, the same effect as (14) can be obtained.

(19) The inventive computer program is provided for use in an optical recording apparatus having a CPU and being capable of writing data into an optical disk of various types under a given machine parameter relating to a reproduction signal quality of the written data, wherein the computer program is executable by the CPU for causing the optical recording apparatus to perform a process comprising the steps of storing a relation between the machine parameter and the reproduction signal quality, detecting a type of the optical disk medium to be used for writing of data, estimating the reproduction signal quality based on the stored relation between the machine parameter and the reproduction signal quality and the detected type of the optical disk medium before the writing of the data, and displaying the estimated reproduction signal quality which will be expected when the data is actually written into the optical disk medium of the detected type.

According to this configuration, the inventive program allows the computer to perform the process such that the storing step stores relationship between a reproduction signal quality of data recorded on an optical disk and a machine parameter concerning reproduction signal qualities, the detecting step identifies a recordable optical disk type, the estimating step estimates a reproduction signal quality based on the stored information and the identification result when data is recorded on a recordable optical disk, and the display step displays the estimated reproduction signal quality. Therefore, the same effect as (15) can be obtained.

(20) The inventive computer program is provided for use in an optical recording apparatus having a CPU and being capable of writing data into an optical disk of various types with a certain reproduction signal quality of the written data, wherein the computer program is executable by the CPU for causing the optical recording apparatus to perform a process comprising the steps of conducting a provisional write of test data into the optical disk medium and a measurement of a reproduction signal quality of the written test data, detecting a type of the optical disk medium subjected to the provisional write of the test data, estimating the reproduction signal quality before the writing of the data based on the measured reproduction signal quality of the test data and the detected type of the optical disk medium, and displaying the estimated reproduction signal quality which will be expected when the data is actually written into the detected type of the optical disk medium.

According to this configuration, the inventive program allows the computer to perform the process such that the detecting step identifies a recordable optical disk type, the conducting step measures a reproduction signal quality from data test-written on a recordable optical disk, the estimating step estimates a reproduction signal quality based on the identification result and the measurement result when data is recorded on the recordable optical disk, and the display step displays an estimated reproduction signal quality. Therefore, the same effect as (16) can be obtained.

(21) The inventive computer program is designed for use in an optical recording apparatus having a CPU for recording data into an optical disk medium with a certain reproduction signal quality, wherein the computer program is executable by the CPU for causing the optical recording apparatus to perform a process comprising the steps of storing quality parameters which were used for recording data in the past and which represent the reproduction signal qualities of the data recorded in the past, displaying the stored quality parameters, selecting one of the displayed quality parameters, setting a machine parameter relating to the reproduction signal quality in accordance with the selected quality parameter, and recording the data into the optical disk medium under the set machine parameter.

According to this configuration, the inventive program allows the computer to perform the process such that the storing step stores the signal quality parameters indicating a reproduction signal quality defined when data were recorded on an optical disk in the past, the display step displays the signal quality parameters stored by the storing step, the selecting step selects the displayed signal quality parameter, and then the setting step sets a machine parameter during data recording based on the signal quality parameter selected by the selecting step. Therefore, the same effect as (17) can be obtained.

BRIEF DESCRIPTION OF THE DRAWINGS

FIGS. 4(A), 4(B) and 4(C) show display examples of setting a signal quality parameter indicating the reproduction signal quality.

FIG. 7 is an example of setting parameters corresponding to data types.

DETAILED DESCRIPTION OF THE INVENTION

Figure 1:
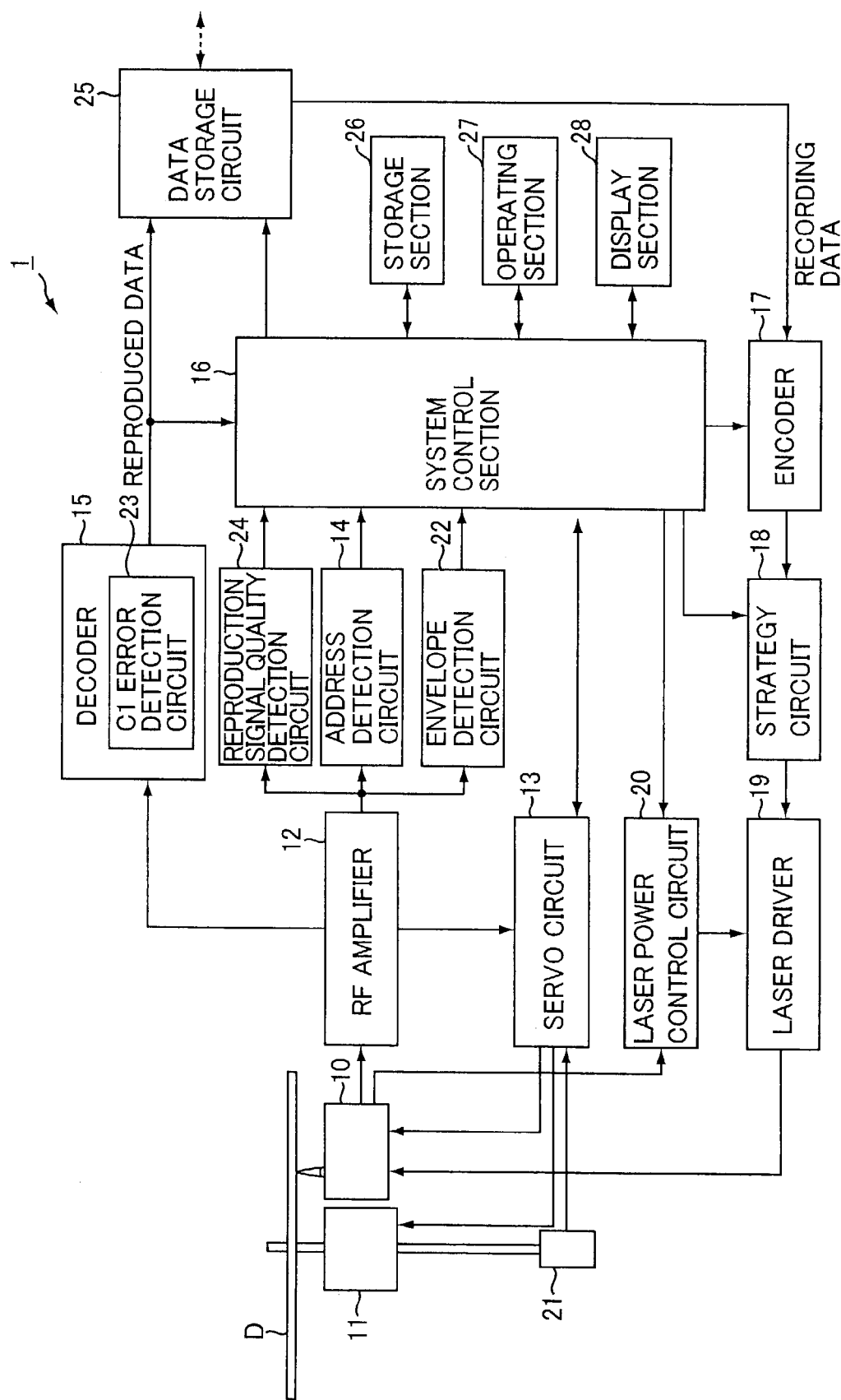
FIG. 1 is a block diagram showing a configuration of an optical disk recording apparatus according to an embodiment of the present invention.

FIG. 1 is a block diagram showing a configuration of an optical disk recording apparatus according to an embodiment of the present invention. As shown in FIG. 1, an optical disk recording apparatus 1 comprises an optical pickup 10; a spindle motor 11; an RF amplifier 12; a servo circuit 13; an address detection circuit 14 as an identification means; a decoder 15; a system control section 16 as a sound quality adjustment means, an identification means, and a setup means; an encoder 17; a strategy circuit 18; a laser driver 19; a laser power control circuit 20; a frequency generator 21; an envelope detection circuit 22; a C1 error detection circuit 23; a reproduction signal quality detection circuit 24 as a reproduction signal quality measurement means; a data storage circuit 25; a storing section 26 as a storage means; an operating section 27 as a selecting means and an input means; and a display section 28 as a display means. A data writing section as a data recording means comprises the optical pickup 10, the servo circuit 13, the encoder 17, the strategy circuit 18, the laser driver 19, and the laser power control circuit 20.

The spindle motor 1 rotatively drives an optical disk D where data is to be recorded. At the tip of a rotating shaft of the spindle motor, there is provided an optical disk chucking mechanism (not shown) comprising a turn table and the like to chuck an optical disk. The optical pickup 10 comprises an optical system including a laser diode, a lens, and a mirror; a return light (reflected light) receiving element; and a focus servo mechanism. When recording and reproducing data, the optical pickup 10 irradiates a laser beam to the optical disk D, receives the return light from the optical disk D, and outputs an RF signal to the RF amplifier 12. The RF signal is a light receiving signal processed by EFM (Eight to Fourteen Modulation). The focus servo mechanism maintains a constant distance between a lens of the optical pickup 10 and a data surface of the optical disk. The optical pickup 10 has a monitor diode. The return light from the optical disk D causes the monitor diode to generate an electric current that is supplied to the laser power control circuit 20.

The frequency generator 21 supplies the servo circuit 13 with a signal for detecting an angle of rotation and a revolution speed output from the spindle motor 11.

The RF amplifier 12 amplifies the EFM modulated RF signal supplied from the optical pickup 10 and outputs the amplified RF signal to the servo circuit 13, the address detection circuit 14, the envelope detection circuit 22, the reproduction signal quality detection circuit 24 for measuring the reproduction signal quality, and the decoder 15.

During reproduction, the decoder 15 EFM-demodulates the EFM-modulated RF signal supplied from the FR amplifier 12 to generate reproduction data and outputs this data to the data storage circuit 25. During recording, the decoder 15 EFM-demodulates the RF signal supplied from the RF amplifier 12 when reproducing a test-recorded area. Based on the demodulated signal, the C1 error detection circuit 23 detects a C1 error and outputs it to the system control section 16. The C1 error detection circuit 23 applies error correction using an error correction code called the CIRC (Cross Interleaved Reed Solomon Code) to the EFM-demodulated signal to detect the number of C1 errors (C1 error value).

Before recording data, the optical disk recording apparatus 1 according to the embodiment performs a test record on a PCA (Power Calibration Area) toward the inside periphery of the optical disk D. Based on a reproduction result from the test-recorded area, the optical disk recording apparatus 1 is configured to request recording conditions for good recording on the optical disk D. The C1 error detection circuit 23 detects a C1 error for the reproduction signal in the test-recorded area and outputs it to the system control section 16.

Figure 2:
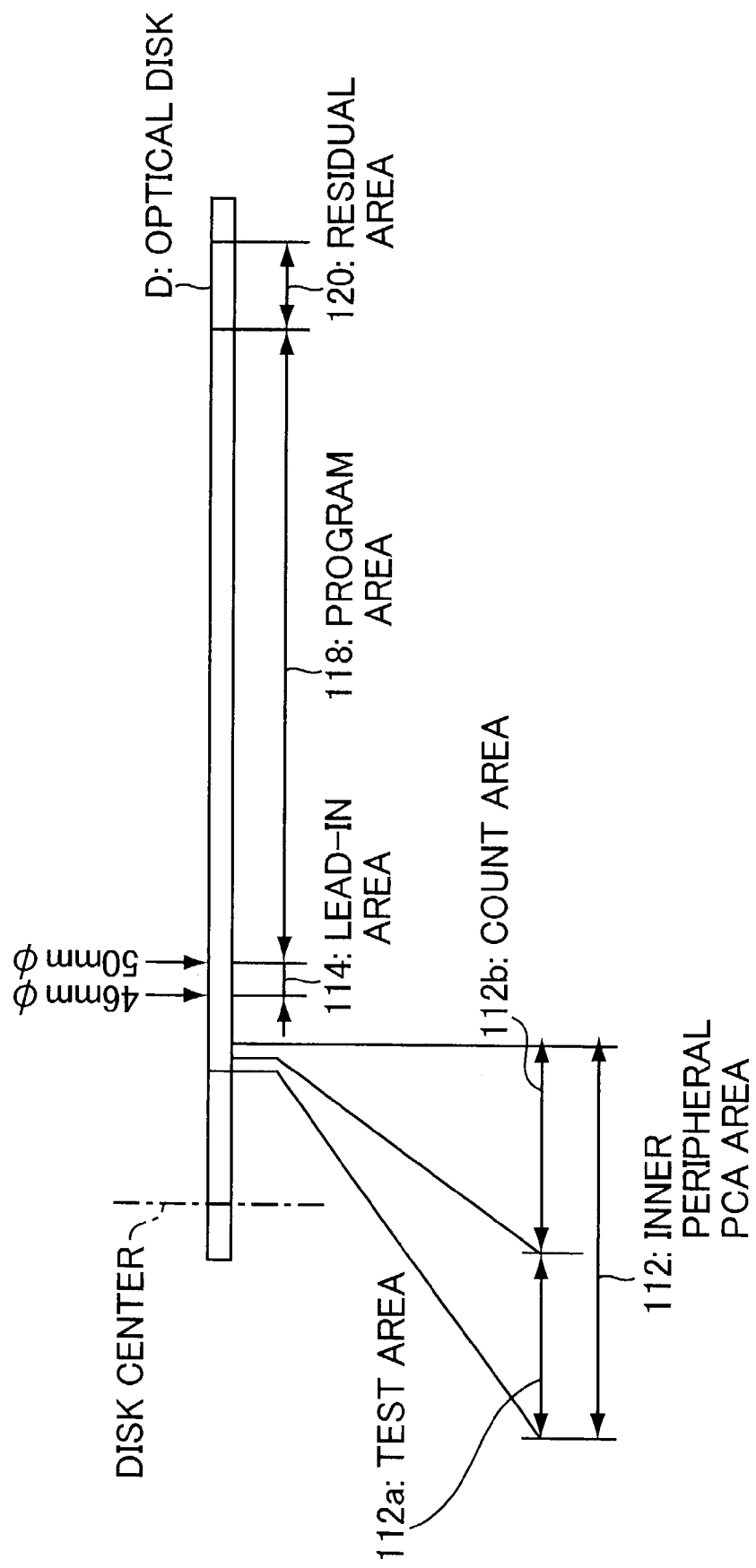
FIG. 2 is a sectional view showing an area arrangement of an optical disk.

With reference to FIG. 2, the following describes areas on the optical disk D for test recording. FIG. 2 is a sectional view showing a configuration of optical disk areas. The optical disk D has an external diameter of 120 mm. There is provided a lead-in area 114 between diameters 46 and 50 mm of the optical disk D. Outward of the lead-in area 114, there are provided a program area 118 to record data and a residual area 120. An inside PCA 112 is provided inward of the lead-in area 114. The inside PCA 112 contains a test area 112a and a count area 112b. As mentioned above, the test area 112a is used for test recording prior to actual recording. The test area 112a is provided with an area capable of a plurality of test records. At the end of test recording, the count area 112b records an EFM signal that indicates to which portion of the test area 112a the recording is complete. When test recording is performed next on the optical disk D, the EFM signal is detected from the count area 112b to make it possible to determine from which position in the test area 112a to start the test recording. The optical disk recording apparatus 1 according to the embodiment performs test recording on the test area 112a before actual recording of data.

Back to FIG. 1, the data storage circuit 25 temporarily stores reproduction data on the optical disk D output from the decoder or data from the outside of the optical disk recording apparatus 1. During reproduction, the data storage circuit 25 outputs the stored data to a data reproduction section (not shown). When recording data on a recordable optical disk, the data storage circuit 25 outputs the stored data to the encoder 17.

The address detection circuit 14 extracts a wobble signal component included in the RF signal supplied from the RF amplifier 12. The wobble signal component contains time information (address information) about each position, identification information (disk ID) for identifying optical disks, and information to indicate disk types such as pigments used for disks. The address detection circuit 14 decodes these pieces of information and outputs them to the system control section 16. Here, the wobble signal component indicates a wobble frequency of a wobbling recording track on the recordable optical disk. The time information and the identification information are recorded by FM-modulating the wobbling frequency.

During reproduction of the test recording area on the optical disk D, the reproduction signal quality detection circuit 24 calculates the β value or the asymmetry concerning the reproduction signal quality from the RF signal supplied from the RF amplifier 12 and outputs the calculated result to the system control section 16. Here, the β value can be found as β=(a+b)/(a−b), where "a" is a peak level ("+" sign) of the EFM-modulated signal waveform and "b" is a bottom level ("−" sign) thereof.

Before test recording on the optical disk D, the envelope detection circuit 22 detects an envelope of the EFM signal in the count area 112b on the optical disk D in order to detect from which part of the test area 112a on the optical disk D the test recording should start.

The servo circuit 13 controls revolutions of the spindle motor 11 and controls the focus, tracking, and movement of the optical pickup 10. During recording, the optical disk recording apparatus 1 according to the embodiment can select the CAV (Constant Angular Velocity) system to drive the optical disk D at each constant speed or the CLV (Constant Linear Velocity) system to drive the optical disk D at a constant linear speed. Accordingly, the servo circuit 13 selects the CAV or CLV system in accordance with a control signal supplied from the system control section 16. The servo circuit 13 provides CAV control so that a revolution speed of the spindle motor 11 detected by the frequency generator 21 matches the preset revolution speed. The servo circuit 13 provides CLV control to spindle motor 11 so that the wobble signal in the RF signal supplied from the RF amplifier 12 matches the preset velocity scale.

The encoder 17 EFM-modulates recorded data supplied from the data storage circuit 25 and outputs the data to the strategy circuit 18. The strategy circuit 18 performs time axis correction and the like to the EFM signal supplied from the encoder 17 and outputs the signal to the laser driver 19. The laser driver 19 drives the laser diode of the optical pickup 10 in accordance with a signal modulated correspondingly to recorded data supplied from the strategy circuit 18 under control of the laser power control circuit 20.

The laser power control circuit 20 controls laser power generated from the laser diode of the optical pickup 10. More specifically, the laser power control circuit 20 controls the laser driver 19 so that the optical pickup 10 can generate a laser beam with an optimum laser power based on an electric current value supplied from the monitor diode of the optical pickup 10 and information indicating a target value for the optimum laser power supplied from the system control section 16.

The system control section 16 comprises a CPU, ROM, RAM, and the like, and controls each part of the optical disk recording apparatus 1 in accordance with a program stored in ROM. The system control section 16 controls each part of the optical disk recording apparatus 1 so that test recording is performed for a specified area on the optical disk D mounted on the apparatus prior to actual data recording as mentioned above. From a signal obtained during reproduction of the test-recorded area, the system control section 16 finds relationship between the reproduction signal quality parameter and the machine parameter (recording conditions) for the optical disk D test-recorded by the optical disk recording apparatus 1 based on the reproduction signal quality such as the $\beta$ value detected by the reproduction signal quality detection circuit 24 and the C1 error count value detected by the C1 error detection circuit 23. In this manner, the system control section 16 performs recording speed determination processing and the like to find a recordable speed capable of good recording without recording errors.

The storing section 26 stores data prepared by experiments and the like. The operating section 27 is operated for selecting and entering a parameter representing the reproduction signal quality. The display section 28 displays the reproduction signal quality of data recorded on an optical disk.

The optical disk recording apparatus 1 having the above-mentioned configuration can use a personal computer as a recording and reproducing apparatus for optical disks. That is to say, an optical disk drive can provide the optical pickup 10, the spindle motor 11, and the frequency generator 21. An MPU and its peripheral circuits or those for the optical disk drive can provide the RF amplifier 12, the servo circuit 13, the address detection circuit 14, the decoder 15, the encoder 17, the strategy circuit 18, the laser driver 19, the laser power control circuit 20, the envelope detection circuit 22, the C1 error detection circuit 23, and the reproduction signal quality detection circuit 24. The MPU can provide the system control section 16. Memory, RAM, and ROM can provide the data storage circuit 25 and the storing section 26. Input devices such as a keyboard and a mouse can provide the operating section 27. A monitor can provide the display section 28.

The following describes operations for recording data on the optical disk D in the optical disk recording apparatus 1 having the above-mentioned configuration. The inventors conducted various experiments and examinations in order to obtain good sound quality while copying music data from a source disk to a recordable optical disk. As a result, we found that it is possible to obtain almost the same sound quality as for the source disk when music data is copied to the recordable optical disk as a copy destination by maintaining almost the same reproduction signal waveform, i.e., the reproduction signal quality between the music data recorded on the source disk and that recorded on the copy destination optical disk.

When copying data recorded on an optical disk, a first embodiment of the present invention measures the reproduction signal quality of an optical disk (source optical disk) where data is recorded. Data is recorded on a copy destination optical disk by setting the machine parameter associated with the reproduction signal quality to a specified value so as to obtain the reproduction signal quality almost same as that for the source optical disk.

When reading music data from a pressed CD (music CD) or a recorded CD-R, for example, the reproduction signal quality is measured to find signal quality parameters such as the $\beta$ value and the asymmetry. Then, a specified value is determined for a machine parameter related to the reproduction signal quality such as a target $\beta$ value for OPC (Optimum Power Control) based on the measured signal quality parameters so as to reproduce a reproduction waveform of the original music data as faithfully as possible. The music data recorded on the source optical disk is recorded onto a recordable optical disk based on the above-mentioned setting. When the OPC is performed before actual recording to reproduce test data test-recorded with a plurality of laser powers, it is a good practice to measure the reproduction signal quality, find the relationship between the measured signal quality parameter and the machine parameter associated with the reproduction signal quality, store a result in the storing section 26, and adjust the machine parameter. Further, it is a good practice to beforehand find the relationship between the signal quality parameter representing the reproduction signal quality and the machine parameter associated with the reproduction signal quality, store a result in the storing section 26, and read the relationship from the storing section 26 during recording to adjust the machine parameter.

This method can provide almost the same reproduction signal waveform or reproduction signal quality for music data on the source optical disk and on the copy destination optical disk, making it possible to almost equally adjust the sound quality of music data. Data to be processed is not limited to music data.

Signal quality parameters representing the reproduction signal quality include not only the $\beta$ value and the asymmetry, but also an HF modulation factor, HF amplitude, HF reflectance, average reflectance, crosstalk, jitter, deviation, and effective length. When measuring the signal quality of music data, it is a good practice to measure one or more of these signal quality parameters to set the machine parameter. These signal quality parameters are not completely independent of each other. Changing one parameter may also change the other parameters accordingly.

Machine parameters associated with the reproduction signal quality for data recording determine the reproduction signal quality of data that is recorded on an optical disk. For example, such parameters include a write strategy, laser power irradiated to an optical disk during data recording, a target $\beta$ value for OPC or running OPC, focus balance, tracking balance, and recording speed.

When the reproduction signal quality varies with inside and outside peripheries on the copy origin disk, it may be preferable to record data by varying the machine parameter at recording positions (radial positions or times) and to provide almost the same reproduction signal quality with differences at the inside and outside peripheries.

Figure 3:
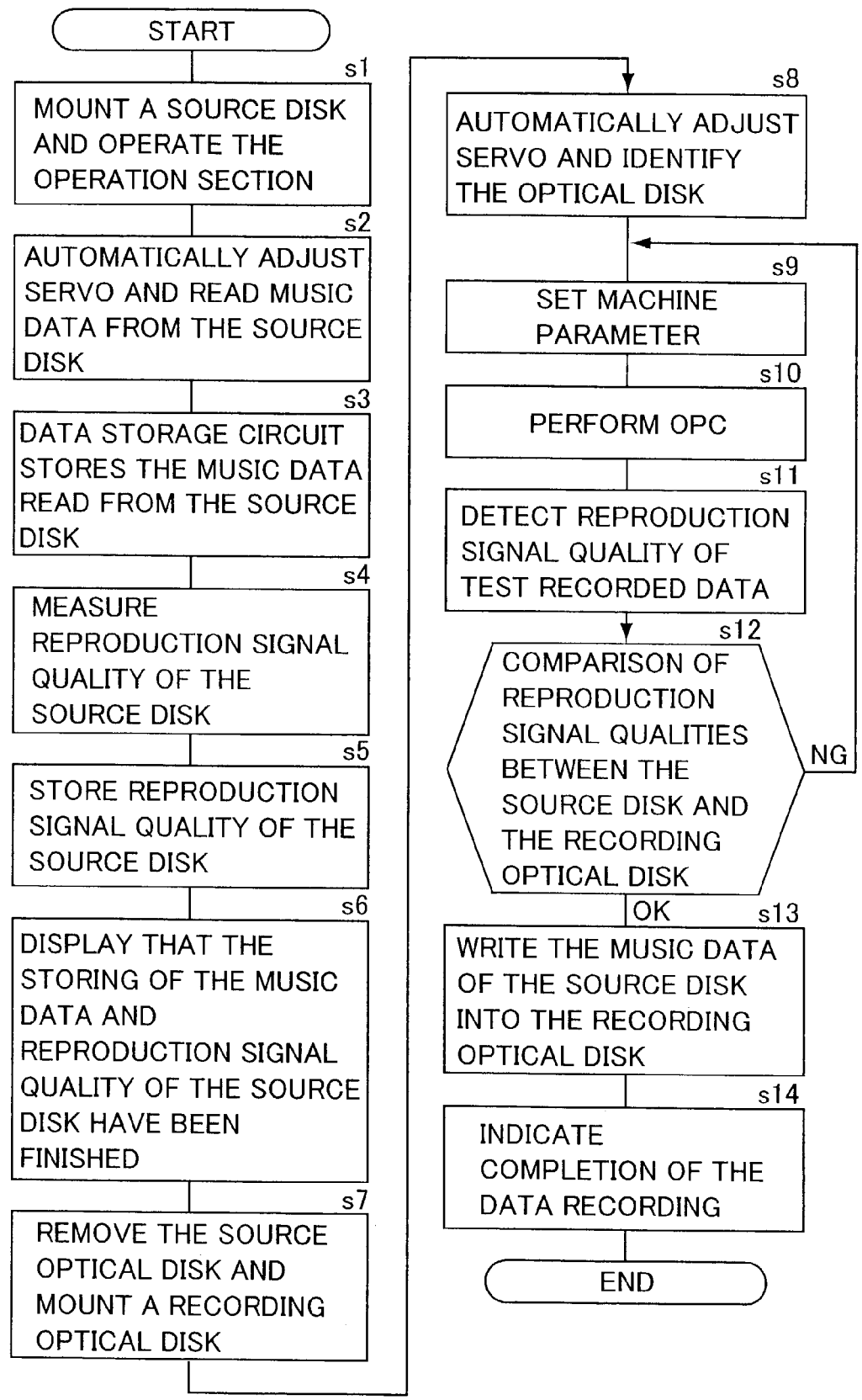
FIG. 3 is a flowchart for explaining the first embodiment of the present invention.

FIG. 3 exemplifies a flowchart for explaining the first embodiment of the present invention. The following describes the signal quality parameter as a $\beta$ value for representing the reproduction signal quality. First, a user mounts a source disk such as a pressed CD (music CD) or a recorded CD-R on the optical disk recording apparatus 1 and operates the operating section 27 to reproduce music data (s1). When receiving a signal from the operating section 27, the system control section 16 automatically adjusts a servo to read music data from the source disk. The servo circuit 13 outputs control signals for the focus servo mechanism and a tracking servo mechanism to the optical pickup 10. The servo circuit 13 also outputs a revolution control signal to the spindle motor 11. The system control section 16 outputs a specified signal for laser power control to the laser power control circuit 20. The laser power control circuit 20 outputs a control signal for the laser driver 19. The laser driver 19 supplies the optical pickup 10 with a power control signal for the laser beam generated from the laser diode. The laser diode of the optical pickup 10 generates the laser beam with a specified laser power. The light receiving element of the optical pickup 10 receives return light (reflected light) of the laser beam. The return light is converted into an electric signal and is output to the RF amplifier 12 (s2).

The music data signal is amplified in the RF amplifier 12, is decoded in the decoder 15, and is output to the data storage circuit 25. The data storage circuit 25 stores the music data of the source disk (s3).

The signal amplified in the RF amplifier 12 is output to the reproduction signal quality detection circuit 24. The reproduction signal quality detection circuit 24 measures the reproduction signal quality of the music data from the source disk (s4). A measurement result is output to the system control section 16 and is stored in the built-in RAM (s5). When the music data from the source disk is entirely stored in the data storage circuit 25, the system control section 16 allows the display section 28 to display that the music data and the reproduction signal quality of the source disk have been stored completely (s6).

When confirming the display, the user removes the source disk from the optical disk recording apparatus 1 and then mount an optical disk capable of recording data on the optical disk recording apparatus 1 (s7).

The system control section 16 automatically adjusts the servo for the data recording optical disk and outputs specified signals to the servo circuit 13, the laser power control circuit 20, and the encoder 17. The optical pickup 10 irradiates a laser beam to the optical disk. The light receiving element receives the return light of the laser beam and converts that light into a signal which is then output to the RF amplifier 12. This signal is output to the address detection circuit 14. The address detection circuit 14 reads ATIP (Absolute Time In Pre-groove) information in the signal to determine the optical disk type. Then, an optical disk address is detected from the signal and is output to the system control section 16 (s8). Based on the optical disk identification information, the system control section 16 reads data stored in the storing section 26. Based on this data and the reproduction signal quality measurement result previously stored in the RAM, the system control section 16 sets the machine parameter (s9).

The system control section 16 then checks if the machine parameter is specified correctly, and performs OPC (Optimum Power Control) to determine an optimum laser power. That is to say, based on the specified machine parameter, the system control section 16 outputs specified signals to the servo circuit 13, the laser power control circuit 20, the encoder 17, and the strategy circuit 18. The optical pickup 10 records a test signal in the PCA and reproduces it. Its return light is output to the reproduction signal quality detection circuit 24 via the RF amplifier 12 (s10). The reproduction signal quality detection circuit 24 detects the reproduction signal quality from the test signal and outputs it to the system control section 16 (s11). The system control section 16 compares data for the reproduction signal quality output from the reproduction signal quality detection circuit 24 with the source disk's reproduction signal quality stored in the RAM (s12). As a result of the comparison, if there is a problem such as a failure to obtain almost the same reproduction signal quality, the machine parameter at step s9 is changed. Steps s9 through s12 are reexecuted. If there is no problem, the current machine parameter setting is used to allow the optical disk to record the music data that is read from the source disk and is stored in the data storage circuit 25. In other words, the music data is output from the data storage circuit 25. In addition, specified signals are output to the servo circuit 13, the laser power control circuit 20, the encoder 17, and the strategy circuit 18 based on the defined machine parameter. The optical pickup 10 irradiates a laser beam corresponding to the music data onto the recordable optical disk to record the music data (s13). When the music data recording is complete, the system control section 16 allows the display section 28 to indicate completion of the recording (s14). The process then terminates. Namely, the inventive method is designed for writing data originally recorded in a source disk medium with an original reproduction signal quality, into an object disk medium by means of an optical recording apparatus. The inventive method comprises the steps of provisionally storing a relation between a machine parameter settable to the optical recording apparatus and a reproduction signal quality of data written by the optical recording apparatus, measuring the original reproduction signal quality of the data originally recorded in the source disk medium, setting a value of the machine parameter of the optical recording apparatus in matching with the measured original reproduction signal quality based on the provisionally stored relation between the machine parameter and the reproduction signal quality, and writing the data into the object disk medium by means of the optical recording apparatus with the set machine parameter so as to secure the reproduction signal quality of the written data comparable to the original reproduction signal quality.

The storing section 26 previously stores data such as machine parameters related to the reproduction signal quality for data recording. Such parameters include a write strategy, a target β value for OPC, and the like corresponding to the disk identification information. Further, with respect to the disk identification information, it is a better practice to conduct an experiment and the like to find data representing the relationship between the signal quality parameter indicating the reproduction signal quality and the machine parameter associated with the reproduction signal quality, and store the relationship data in the storing section 26. Namely, the step of provisionally storing may comprise storing a plurality of the relations in correspondence to various types of source disk medium, and an additional step is conducted for identifying or detecting the type of the source disk medium to be used for writing of data, so that the step of setting sets the value of the machine parameter of the optical recording apparatus in matching with the measured original reproduction signal quality based on a particular relation between the machine parameter and the reproduction signal quality, stored in correspondence to the detected type of the source disk medium. Data can be recorded with almost the same reproduction signal quality as for the source disk by adjusting the machine parameter based on the source disk's reproduction signal quality and the predetermined relationship.

The OPC is used to record test data using a plurality of laser powers, reproduce the test data, check the reproduction signal quality, and determine an optimum laser power. At this time, it may be preferable to measure reproduction signal qualities under a plurality of recording conditions to find the relationship between a signal quality parameter indicative of the reproduction signal quality and a machine parameter related to the reproduction signal quality for the optical disk. Moreover, instead of recording data by varying the laser power under OPC, it may be preferable to change the machine parameter such as a write strategy and find the relationship with a machine parameter related to the reproduction signal quality. Data can be recorded with almost the same reproduction signal quality as for the source disk by adjusting the machine parameter based on the relationship obtained in this manner and the source disk's reproduction signal quality. Alternatively, it may be preferable to return to step s9 to verify the adjustment conditions. Namely, the inventive method is designed for writing data originally recorded in a source disk medium with an original reproduction signal quality, into an object disk medium by means of an optical recording apparatus having a machine parameter. The inventive method comprises the steps of conducting a provisional write of test data into the object disk medium by means of the optical recording apparatus, an analysis of a reproduction signal quality of the test data written in the object disk medium, and a determination of a relation between the analyzed reproduction signal quality and the machine parameter of the optical recording apparatus used in the provisional write, measuring the original reproduction signal quality of the data originally recorded in the source disk medium, setting a value of the machine parameter of the optical recording apparatus in matching with the measured original reproduction signal quality based on the determined relation between the machine parameter and the reproduction signal quality, and writing the data into the object disk medium by means of the optical recording apparatus with the set machine parameter so as to secure the reproduction signal quality of the written data comparable to the original reproduction signal quality.

A second embodiment of the present invention will now be described. According to the second embodiment of the present invention, a user can specify any value for the signal quality parameter indicating the reproduction signal quality of a recordable optical disk on the optical disk recording apparatus. That is to say, when the optical disk recording apparatus records music data on an optical disk, the signal quality parameter indicating the reproduction signal quality is configured to be definable according to user preferences. An object is to provide an environment capable of defining the sound quality preferable to the user. A detailed description follows.

Signal quality parameters representing the reproduction signal quality include not only the β value and the asymmetry, but also an HF modulation factor, HF amplitude, HF reflectance, average reflectance, crosstalk, jitter, deviation, and effective length. These signal quality parameters are not completely independent of each other. Changing one parameter may also change the other parameters accordingly.

Machine parameters associated with the reproduction signal quality for data recording determine the reproduction signal quality of data that is recorded on an optical disk. For example, such parameters include a write strategy, laser power irradiated to an optical disk during data recording, a target β value for OPC or running OPC, focus balance, tracking balance, and recording speed.

When the machine parameters are changed, however, a degree of changing the signal quality parameters depends on disk types. Accordingly, when a user changes the machine parameters, it is difficult to obtain the intended reproduction signal quality. According to the present invention, the user can specify signal quality parameters indicating the reproduction signal quality according to his or her preferences. Based on any specified signal quality parameter, the apparatus is configured to adjust machine parameters in accordance with the relationship between the signal quality parameter indicative of the reproduction signal quality and the machine parameter related to the reproduction signal quality for the optical disk.

Depending on reproduction signal quality parameter values, data recorded on a recordable optical disk may not be reproduced. In addition, the intended reproduction signal quality may be available only outside a specifiable range of the machine parameters. When the user attempts to select such an improper reproduction signal quality parameter, it may be preferable to indicate an alert on the display section or restrict the specifiable range of the reproduction signal quality parameter values.

FIG. 4 shows display examples of setting a signal quality parameter indicating the reproduction signal quality to be displayed on the display section. As shown in FIG. 4 (A), it may be preferable to display a graph on the display section and allow the user to select a preset value. As shown in FIG. 4(B), it may be yet preferable to display a table of signal quality parameter patterns representing reproduction signal qualities and allow the user to select a preset value from the table. As shown in FIG. 4(B), it may be still preferable to display a gauge for the user to select any value on the display section and allow the user to select an intended preset value. In this case, changing the preset β value accordingly changes parameters for the C1 error, the jitter, and the sound, for example.

The user can define signal quality parameters indicating the reproduction signal quality to any values. When recording music data on an optical disk, for example, the user can set the sound quality according to his or her preference. It is possible to save costs and time for selecting conventional optical disk recording apparatuses and recordable optical disks.

When a recording apparatus differs from a reproducing apparatus, the sound quality can be set to match characteristics of the reproducing apparatus. It is possible to reduce the chances of such a problem that the recording apparatus provides good signal quality, whereas the reproducing apparatus reproduces data with degraded sound quality.

It is preferable to provide the optical disk recording apparatus according to the second embodiment with a selection switch for determining whether the apparatus automatically sets signal quality parameters indicating the reproduction signal quality or a user specifies any values for these parameters. When the apparatus automatically sets the signal quality parameters indicating the reproduction signal quality, it is necessary to provide an initial value (default value).

Figure 5:
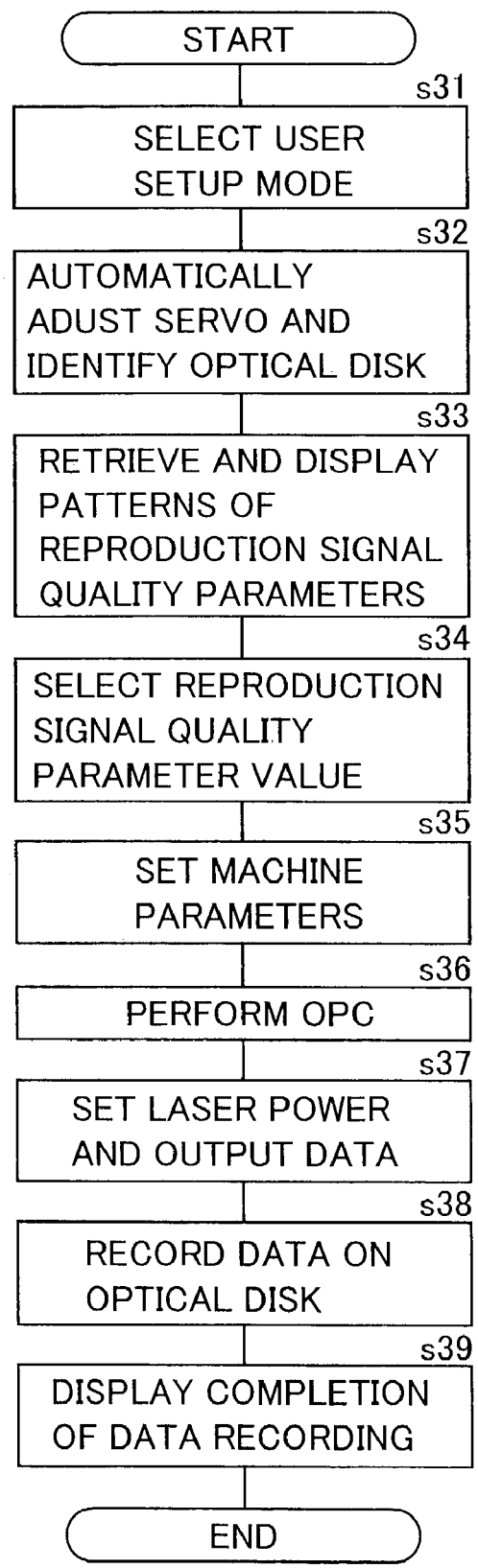
FIG. 5 is a flowchart for explaining the second embodiment of the present invention.

FIG. 5 exemplifies a flowchart for explaining the second embodiment of the present invention. It is assumed that the data storage circuit 25 already stores data to be recorded on an optical disk. First, a user operates a selection switch of the operating section 27 to select a mode that allows the user to set signal quality parameters indicating the reproduction signal quality. The user mounts a recordable optical disk on the optical disk recording apparatus 1 (s31). The system control section 16 automatically adjusts the servo to determine a type of the mounted recordable optical disk. Specified signals are output to the servo circuit 13, the laser power control circuit 20, and the encoder 17. These signals allow the optical pickup 10 to irradiate a laser beam to the recordable optical disk. The light receiving element of the optical pickup 10 receives return light of the laser beam. The return light is converted into an electric signal that is then output to the RF amplifier 12. The signal is amplified in the RF amplifier 12 and is output to the address detection circuit 14. The address detection circuit 14 detects ATIP information (address information) that is then output to the system control section 16 (s32). Based on this signal, the system control section 16 determines the optical disk type. The system control section 16 retrieves data patterns of signal quality parameters indicating the reproduction signal quality from the storing section 26. This data is converted into, e.g., a table and is displayed on the display section 28 (s33). The user operates the operating section 27 to select an intended value for the signal quality parameter from the table displayed on the display section 28 and enter the value (s34). Based on the selected signal quality parameter value, the system control section 16 adjusts machine parameters related to the reproduction signal quality (s35). It may be preferable to adjust the machine parameters based on the relationship between the signal quality parameter (stored in the storing section 26) indicating the reproduction signal quality of the optical disk and the machine parameter related to the reproduction signal quality and based on any specified signal quality parameter. Alternatively, during the OPC to be described later, it may be also preferable to adjust the machine parameters based on the relationship between the signal quality parameter indicating the reproduction signal quality of the optical disk and the machine parameter related to the reproduction signal quality and based on any specified signal quality parameter.

In order to perform the OPC, specified signals are output to the servo circuit 13, the laser power control circuit 20, and the encoder 17 for test recording. When a test-recorded position is reproduced, the corresponding return light is received by the light receiving element of the optical pickup 10 and is converted into an electric signal. The RF amplifier 12 amplifies the signal and outputs it to the reproduction signal quality detection circuit 24 (s36). The system control section 16 sets optimum laser power based on the signal output from the reproduction signal quality detection circuit 24 and the like. The system control section 16 allows the data storage circuit 25 to output data to be recorded on the recordable optical disk (s37). The optical pickup 10 irradiates this data as a laser beam via the encoder 17, the strategy circuit 18, and the laser driver 19 and records the data on the optical disk (s38). When the data recording is complete, the optical disk recording apparatus 1 uses the display section 28 to indicate completion of the data recording and terminates the process (s39). Namely, the inventive optical recording apparatus is designed for writing data into an optical disk medium and is operable under a quality parameter representing a reproduction signal quality of the written data. The inventive optical recording apparatus comprises an input section that inputs a desired value of the quality parameter, a setting section that sets the inputted value into the quality parameter, and a writing section that writes data into the object disk medium under the set quality parameter to thereby secure a desired level of the reproduction signal quality of the written data in accordance with the inputted value of the quality parameter. Preferably, the inventive optical recording apparatus further comprises a selecting section for selecting either of an automatic mode and a manual mode, such that the setting section operates when the automatic mode is selected for automatically sets a default value into the quality parameter and operates when the manual mode is selected for sets the inputted value into the quality parameter.

A third embodiment of the present invention will now be described. According to the third embodiment of the present invention, the optical disk recording apparatus automatically sets signal quality parameters indicating the reproduction signal quality in accordance with types and formats of data to be recorded such as CD-DA (audio data) and CD-ROM MODE-1 (personal computer data) In other words, the optical disk recording apparatus selects the setting appropriate to each data type. In accordance with the setting, the apparatus adjusts and configures machine parameters to record data on a recordable optical disk. When the optical disk recording apparatus records data on an optical disk, the embodiment provides an environment capable of setting patterns of signal quality parameters concerning the reproduction signal quality corresponding to the data to be recorded.

A more detailed description follows. According to the third embodiment, the system control section 16 determines a type of recording data when the optical disk recording apparatus reads data recorded on a source optical disk or when recording data is transmitted to the data storage circuit from the outside. Based on a determination result, the system control section 16 sets signal quality parameters indicating the reproduction signal quality. When computer data is to be recorded, for example, the apparatus automatically sets parameters concerning the reproduction signal quality so that no error occurs during reproduction of the data. When music data is to be recorded, the apparatus automatically sets parameters concerning the reproduction signal quality so that the sound quality becomes optimum. According to the setting, the apparatus automatically adjusts and configures machine parameters and records the data on a recordable optical disk. It may be preferable to previously store relationship between the reproduction signal quality and a machine parameter for directly and automatically setting the machine parameter. In this manner, a user need not be aware of types of data to be recorded because the optical disk recording apparatus automatically determines the data types. This is especially useful for beginners.

Figure 6:
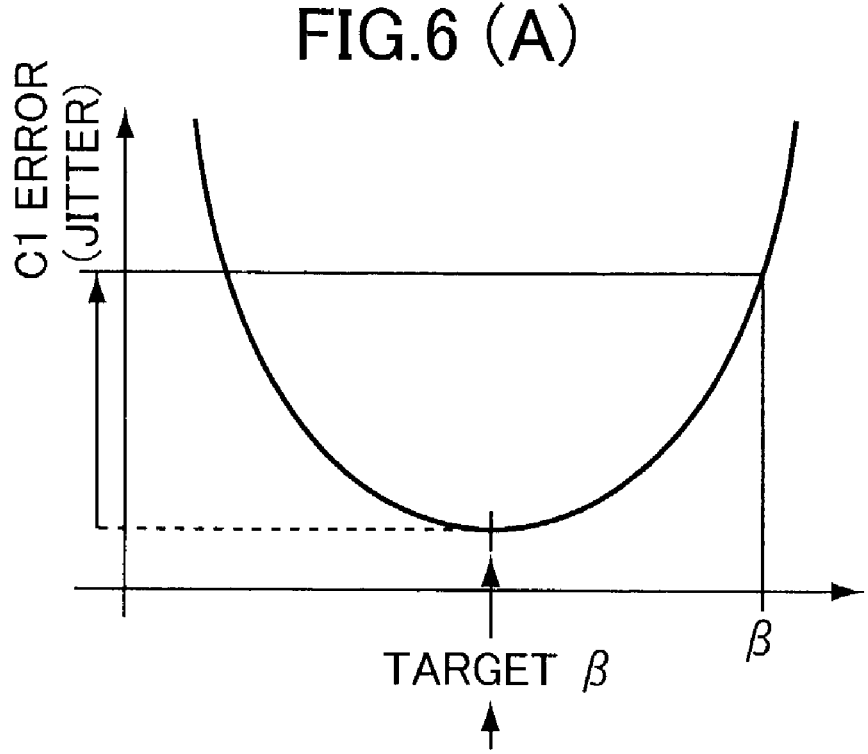
FIGS. 6(A) and 6(B) show relationship between a C1 error and a β value and relationship between a jitter and a power when data is recorded on an optical disk.
Figure 6:
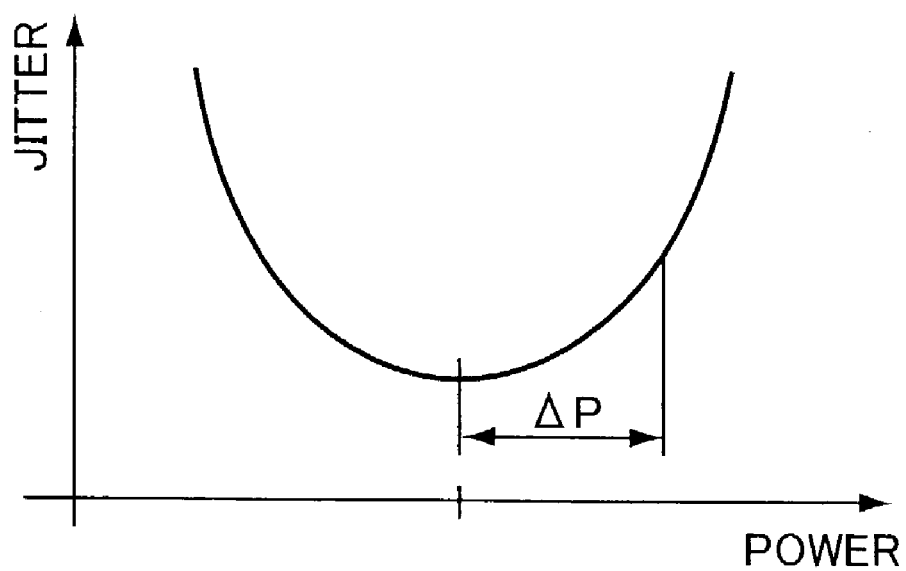

When computer data is to be recorded, it is preferable to pay attention to a C1 error value as the signal quality parameter indicating the reproduction signal quality. FIG. 6(A) shows relationship between C1 error and β values when data is recorded on an optical disk. The relationship between C1 error and β values is represented by a quadratic curve. The recording apparatus parameter should be set so that a C1 error value becomes the bottom value of the quadratic curve. When music data is to be recorded, it is preferable to pay attention to a jitter value. FIG. 6(B) shows relationship between jitter and a laser power. The recording apparatus parameter should be set so that a jitter value becomes the bottom value of the quadratic curve.

For music data, it may be preferable to pay attention to the HF modulation factor (I3/I11) and find a point that yields a large value for the HF modulation factor. Further, it may be also preferable to adjust the machine parameter so as to extend a short pit (especially 3T) by adjusting the write strategy.

When music data is to be recorded on an optical disk, some users may be indifferent to the sound quality and may attach greater importance to the fact that data needs to be reliably recorded on an optical disk without errors. In such a case, it may be preferable to use signal quality parameters concerning the reproduction signal quality for computer data though music data is to be recorded on an optical disk. Consequently, a user can select patterns of signal quality parameters concerning the reproduction signal quality such as an audio-oriented pattern, computer-data oriented pattern, and the like in compliance with data.

FIG. 7 is an example of setting signal quality parameters indicating the reproduction signal quality corresponding to data types. In consideration of the above-mentioned parameters, it may be preferable to display signal quality parameters such as β values indicating the reproduction signal quality in accordance with data types and optical disk types as shown in FIG. 7. Further, it may be preferable to display machine parameters such as write strategies.

Figure 8:
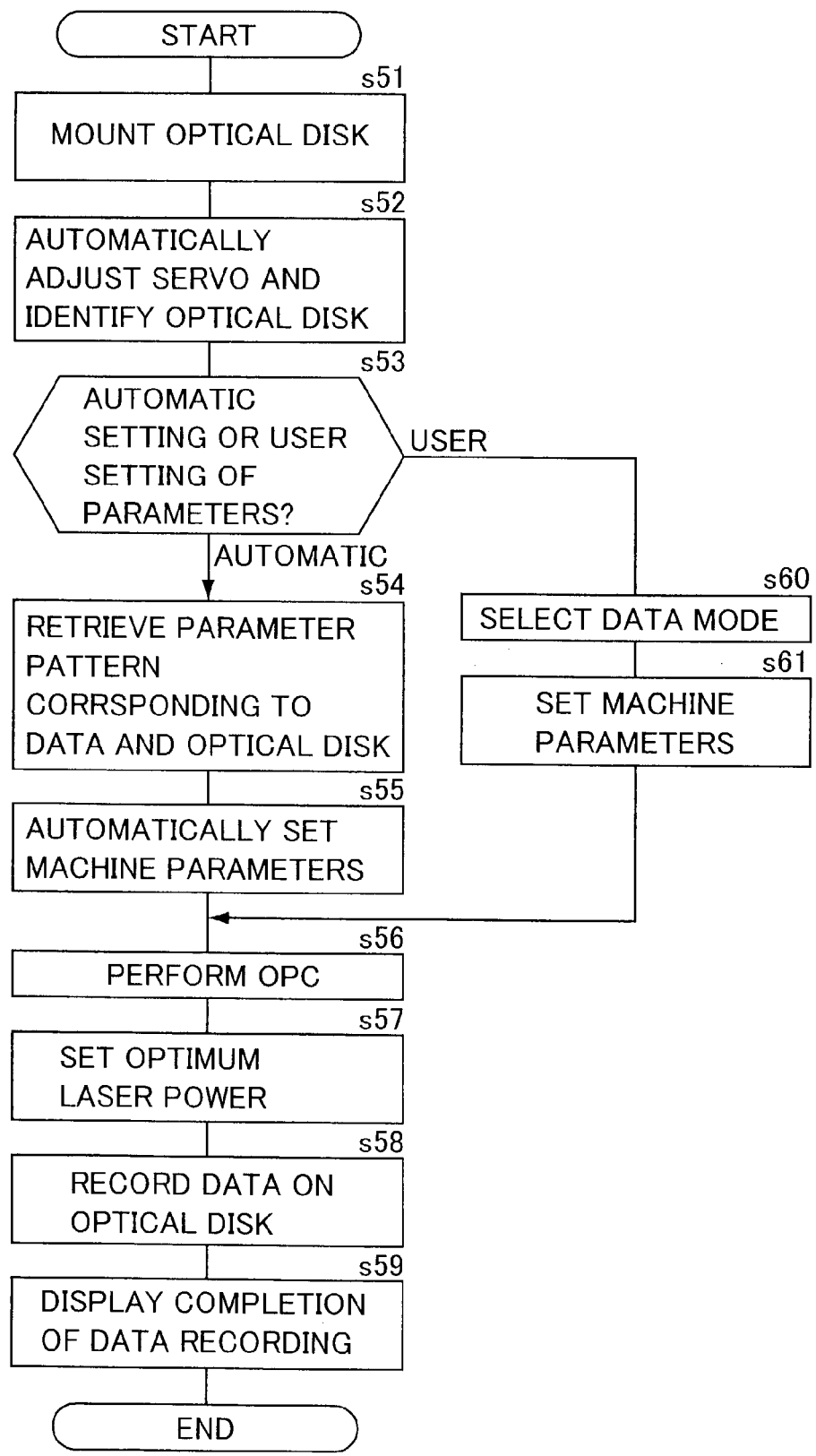
FIG. 8 is a flowchart for explaining the third embodiment of the present invention.

FIG. 8 exemplifies a flowchart for explaining the third embodiment of the present invention. It is assumed that the data storage circuit 25 already stores data to be recorded on an optical disk. First, the user mounts a recordable optical disk on the optical disk recording apparatus 1 (s51). The system control section 16 outputs specified signals to the servo circuit 13, the laser power control circuit 20, and the encoder 17 in order to determine a type of the mounted recordable optical disk. These signals allow the optical pickup 10 to irradiate a laser beam to the recordable optical disk. The light receiving element of the optical pickup receives return light of the laser beam. The return light is converted into an electric signal that is then output to the RF amplifier 12. The signal is amplified in the RF amplifier 12 and is output to the address detection circuit 14. The address detection circuit 14 detects ATIP information (address information) that is then output to the system control section 16 (s52).

Using the selection switch of the operating section 27, the user selects whether the apparatus automatically sets or the user specifies signal quality parameter patterns concerning the reproduction signal quality in accordance with data to be recorded (s53). When parameters are specified automatically, the system control section 16 retrieves a signal quality parameter concerning the reproduction signal quality from the storing section 26 based on data types and disk types stored in the data storage circuit 25 (s54). Based on the selected parameter value, the system control section 16 automatically sets the parameter value. Alternatively, the system control section 16 retrieves a signal quality parameter and a machine parameter concerning the reproduction signal quality and automatically sets the parameters (s55). In order to perform the OPC, specified signals are output to the servo circuit 13, the laser power control circuit 20, and the encoder 17. These signals allow the optical pickup 10 to irradiate a laser beam to the recordable optical disk for test recording. The test-recorded position is reproduced. The light receiving element of the optical pickup 10 receives return light from the test-recorded position. The return light is converted into an electric signal that is then output to the RF amplifier 12 (s56). The RF amplifier 12 outputs the amplified signal to the reproduction signal quality detection circuit 24. The control section 16 sets optimum laser power based on the signal output from the reproduction signal quality detection circuit 24 and the like (s57). The system control section 16 allows the data storage circuit 25 to output data to be recorded on the recordable optical disk. The optical pickup 10 irradiates this data as a laser beam via the encoder 17, the strategy circuit 18, and the laser driver 19 and records the data on the optical disk (s58). When data recording is complete, the optical disk recording apparatus 1 uses the display section 28 to indicate completion of the data recording and terminates the process (s59).

When the user specifies parameters, the apparatus uses a setting of signal quality parameters concerning the reproduction signal quality appropriate to each data type. This setting is converted into a table and is displayed on the display section 28. At this time, machine parameters may be displayed. Using the operating section 27, the user selects the setting of signal quality parameters indicating the reproduction signal quality appropriate to an intended data type (s60). Based on this selection, the system control section 16 sets a machine parameter indicating the signal quality (s61) and performs the process at step s56 and later. Namely, the inventive method is designed for recording data of various types in an optical disk medium with a given reproduction signal quality by means of an optical recording apparatus having a machine parameter relating to the reproduction signal quality of the data. The inventive method comprises the steps of obtaining information specifying a type of the data to be recorded in the optical recording apparatus, changing a value of the machine parameter of the optical recording apparatus in accordance with the specified type of the data, and writing the data into the optical disk medium by means of the optical recording apparatus so that the reproduction signal quality of the written data is made in conformity with the specified type of the data. For example, the step of obtaining information comprises obtaining the information specifying either of a first type composed of music data and a second type composed of computer data, so that the changing step changes a value of the machine parameter of the optical recording apparatus between the first type composed of music data and the second type composed of computer data.

A fourth embodiment of the present invention will now be described. According to the fourth embodiment of the present invention, the apparatus records data by setting machine parameters concerning the reproduction signal quality so that the signal quality varies, i.e., changes or fluctuates during reproduction.

A more detailed description follows. It is preferable that the signal quality varies at a constant frequency so that the signal quality is subject to a change or fluctuation (variation). Further, data may be recorded so that the signal quality varies at a random frequency. Moreover, it may be preferable to irregularly vary the signal quality by setting the center frequency.

To cause a change or fluctuation in the signal quality during reproduction, it may be preferable to vary a recording power, for example. It may be also preferable to vary a write strategy. Further, it may be preferable to vary a focus balance.

When the above-mentioned method is used to cause a change of fluctuation in the signal quality during reproduction, however, a signal may be actually accompanied by an undesirable fluctuation component due to a wobble, disk eccentricity, disk surface vibration, and the like. To solve this, the following method can be used to vary machine parameters and enable the intended fluctuation by canceling an undesirable fluctuation component.

Figure 9:
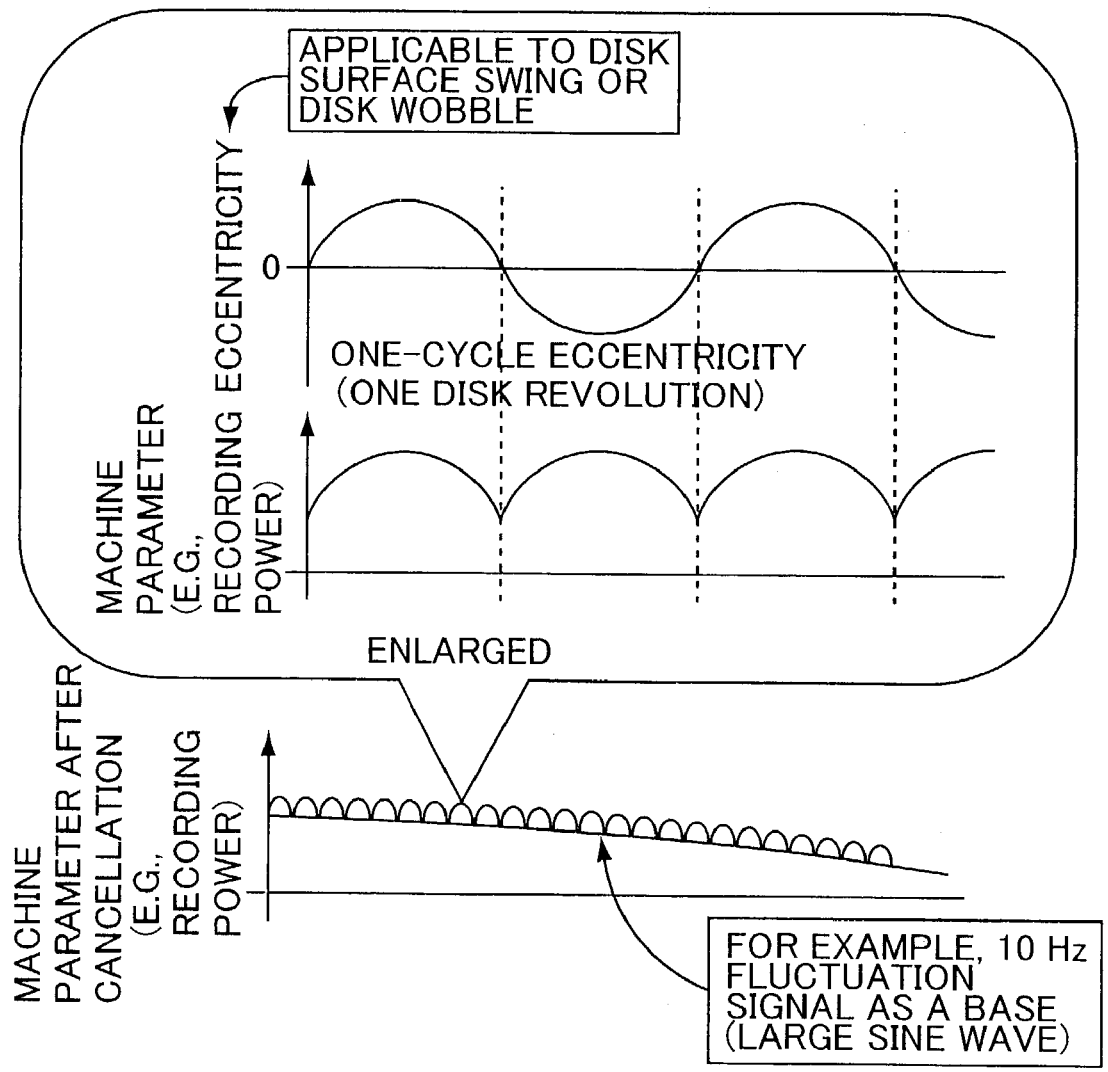
FIG. 9 is a graph showing waveforms of a fluctuation component and a parameter for canceling.

The method according to the embodiment sets a parameter to cancel an undesirable fluctuation component. FIG. 9 is a graph showing waveforms of a fluctuation component and a parameter for canceling it. As shown in FIG. 9, the recording power is specified as a machine parameter so as to correspond to an absolute value of the disk eccentricity frequency. This can cancel a fluctuation caused by the disk eccentricity.

It is possible to add a fluctuation component having an intended frequency to recording data by supplying a signal with any frequency as a base frequency. For example, it is preferable to add the frequency (approximately 10 Hz) of an a wave component, i.e., a type of human brain waves. Human brain waves include α, β, γ wave components and the like. It is known that increasing a wave components relaxes a human being. When a person listens to the music that fluctuates at the frequency (approximately 10 Hz) of α wave components, it is said that α wave components increase in the brain wave in synchronization with that frequency. When music data is recorded on an optical disk with fluctuation at the frequency (approximately 10 Hz) of α wave components, it is expected to provide an effect of relaxing a person who listens to the reproduced music data.

When music data is recorded, new audibility or spiritual effects can be provided by generating a change or fluctuation in the reproduction signal quality during reproduction. Namely, the inventive method is designed for recording data in an optical disk medium with a certain reproduction signal quality by means of an optical recording apparatus operative according to a parameter relating to the reproduction signal quality of the data. The inventive method comprises the steps of setting the optical recording apparatus such as to vary a value of the parameter along a time during operation of the optical recording apparatus, and writing the data into the optical disk medium by means of the optical recording apparatus so that the reproduction signal quality of the written data is made variable along a time according to the setting of the optical recording apparatus. Preferably, the step of setting comprises setting the optical recording apparatus such as to periodically vary a value of the parameter along a time, so that the reproduction signal quality of the written data periodically varies at a given period along a time according to the setting of the optical recording apparatus. For example, the step of setting comprises setting the optical recording apparatus such as to periodically vary a value of the parameter, so that the reproduction signal quality of the written data periodically varies to cancel a periodical fluctuation of the reproduction signal quality inherent to the optical recording apparatus.

Figure 10:
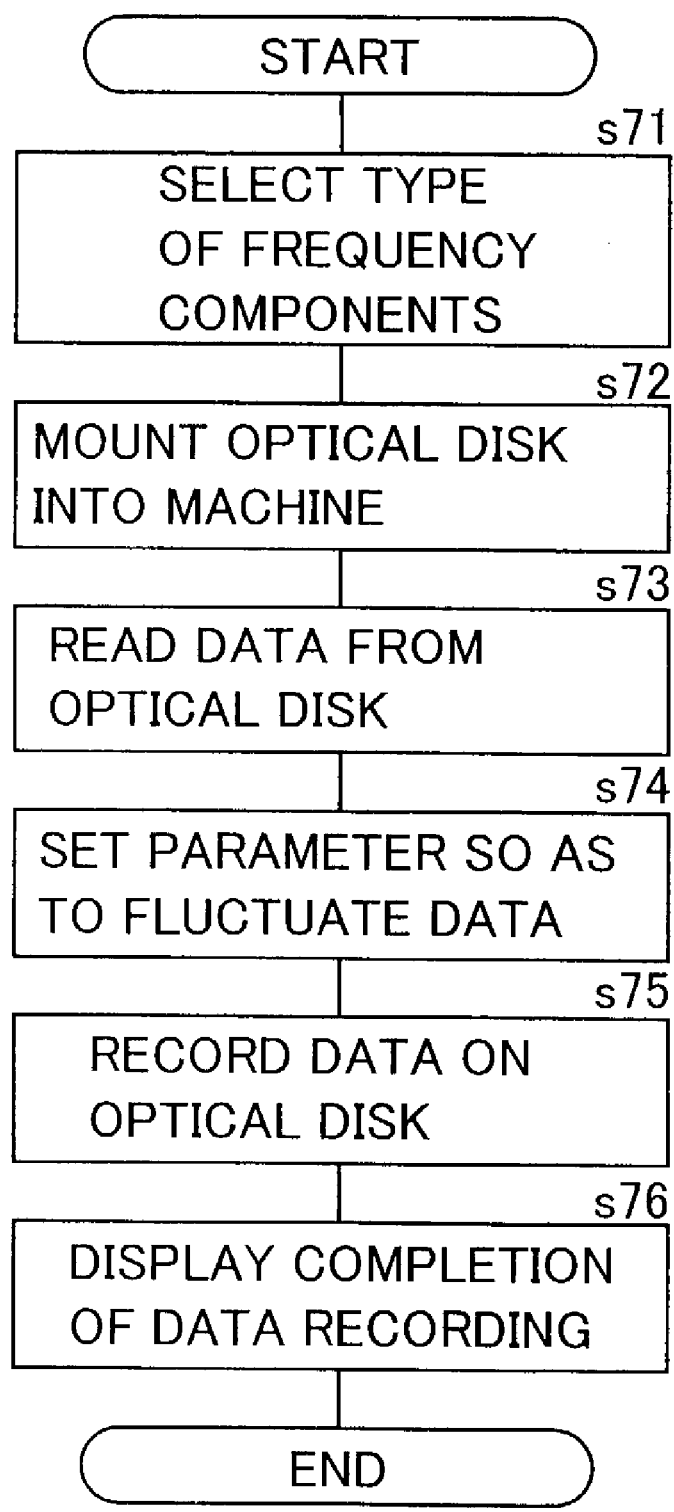
FIG. 10 is a flowchart for explaining the fourth embodiment of the present invention.

Referring now to a flowchart, the following describes operations of the optical disk recording apparatus according to the fourth embodiment of the present invention. FIG. 10 is a flowchart for explaining the fourth embodiment of the present invention. It is assumed that the data storage circuit 25 already stores data to be recorded on an optical disk. Further, it is assumed that the storing section 26 stores settings of frequency components supplied to recording data. First, a user operates a switch of the operating section 27 to select a type of frequency components supplied to recording data (s71). The user then mounts a recordable optical disk on the optical disk recording apparatus 1 (s72). The system control section 16 reads a pattern of frequency components from the storing section 26 in accordance with the selected type of frequency components. In addition, the system control section 16 reads data to be recorded on the optical disk from the data storage circuit 25 (s73). The system control section 16 sets a machine parameter so that the reproduction signal quality of the data fluctuates in response to the specified frequency component (s74). Then, the system control section 16 outputs specified signals to the servo circuit 13, the laser power control circuit 20, the encoder 17, and the strategy circuit 18. The system control section 16 controls the optical pickup 10 to irradiate a laser beam to the optical disk for data recording (s75). When the data recording is complete, the system control section 16 allows the display section 28 to indicate completion of the data recording (s76) and terminates the process.

A fifth embodiment of the present invention will now be described. According to the fifth embodiment of the present invention, data is automatically recorded at an optimum recording speed in accordance with the optical disk's reproduction signal quality and the data to be recorded. A more detailed description follows.

There may be a case where an attempt is made to record data on an optical disk by inadvertently setting a recording speed incompatible with the optical disk. In such a case, as mentioned above, a conventional optical disk recording apparatus has a function of automatically adjusting to a maximum recordable speed correspondingly to the optical disk. Even if this function is used to record data, however, the best reproduction signal quality is not always ensured. Of course, when music data is recorded, the best sound quality does not necessarily result.

The fifth embodiment of the present invention records data at an optimum speed corresponding to an optical disk. When music data is recorded on an optical disk, good sound quality can be obtained. Further, an optimum recording speed can be used in accordance with types of data to be recorded.

The storing section 26 beforehand stores a recording speed most appropriate to the optical disk and the type of data to be recorded. When data is recorded on the optical disk, the apparatus identifies types of that optical disk and data to be recorded. From the storing section 26, the apparatus reads information about an optimum recording speed according to an identification result.

Figure 11:
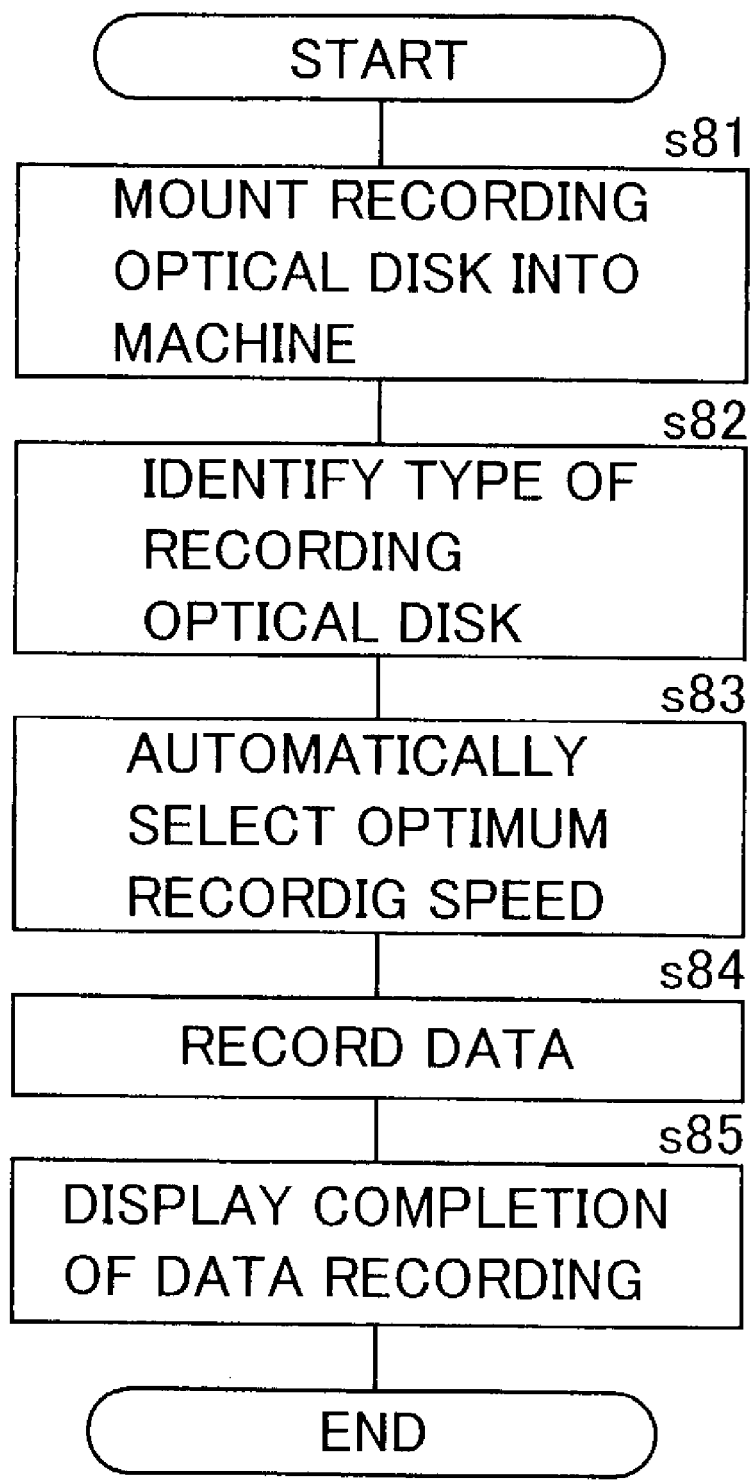
FIG. 11 is a flowchart for explaining the fifth embodiment of the present invention.

The following describes operations of the optical disk recording apparatus according to the fifth embodiment of the present invention. FIG. 11 exemplifies a flowchart for explaining the fifth embodiment of the present invention.

It is assumed that the data storage circuit 25 already stores data to be recorded on an optical disk. The user mounts a recordable optical disk (s81). The system control section 16 automatically adjusts the servo and reads the ATIP information about the recordable optical disk to identify the type of the recordable optical disk (s82). From the storing section 26, the system control section 16 reads information about the optical disk and an optimum recording speed for the data to be recorded. The system control section 16 then automatically selects the optimum recording speed corresponding to the types of the recordable optical disk and the data to be recorded (s83). The data is recorded on the recordable optical disk at the selected recording speed (s84). When the data recording is complete, the system control section 16 allows the display section 28 to indicate completion of the data recording (s85) and terminates the process. The inventive method is designed for recording data of various types into an optical disk medium with a certain reproduction signal quality by means of an optical recording apparatus at a certain recording speed. Namely, the inventive method comprises the steps of providing a relation between a level of the reproduction signal quality and a value of the recording speed with respect to the various types of data, setting a value of the recording speed based on the provided relation in accordance with a type of the data to be recorded, and recording the data into the optical disk medium by means of the optical recording apparatus at the set recording speed to thereby secure an optimum level of the reproduction signal quality for the type of the data. Preferably, the step of providing comprises providing a plurality of relations between a level of the reproduction signal quality and a value of the recording speed in correspondence to various types of optical disk medium, the method further comprising the step of detecting the type of the optical disk medium to be used for writing of data, so that the step of setting sets a value of the recording speed based on a particular relation corresponding to the detected type of the optical disk medium.

A sixth embodiment of the present invention will now be described. According to the sixth embodiment of the present invention, a user is notified of the reproduction signal quality of the data and an estimated reproduction signal quality of the data when recorded on a recordable optical disk before data recording. A more detailed description follows.

A user may want to know the reproduction signal quality of data that is to be recorded on a copy destination optical disk. In such a case, the user can reduce his or her labors and costs if he or she can be provided with information such as an estimated reproduction signal quality of data to be recorded without purchasing optical disks (media).

The optical disk recording apparatus according to the sixth embodiment of the present invention allows the storing section 26 to store signal quality parameters concerning the reproduction signal quality of the optical disk, apparatus storage parameters, and the relationship between parameters. These parameters and relationship are found by previously conducting experiments and the like. When data is recorded on the optical disk, the display section 28 displays the signal quality parameters concerning the reproduction signal quality stored in the storing section 26. Consequently, the user can use the operating section 27 to select a signal quality parameter concerning the reproduction signal quality or the corresponding parameter value presented on the display section 28. When the user operates the operating section 27 to select a given signal quality parameter or its value, the system control section 16 enables the setting result and the machine parameter value stored in the storing section 26. The system control section 16 outputs specified signals to the servo circuit 13, the laser power control circuit 20, the encoder 17, and the strategy circuit 18. Then, the system control section 16 allows the optical pickup 10 to irradiate a laser beam to record the data on the recordable optical disk mounted on the spindle motor. Namely, the inventive optical recording apparatus comprises a writing section capable of writing data into an optical disk of various types under a given machine parameter relating to a reproduction signal quality of the written data, a storing section that stores a relation between the machine parameter and the reproduction signal quality, a detecting section that detects a type of the optical disk medium to be used for writing of data, an estimating section operable before the writing of the data for estimating the reproduction signal quality based on the stored relation between the machine parameter and the reproduction signal quality and the detected type of the optical disk medium, and a display section that displays the estimated reproduction signal quality which will be expected when the data is actually written into the optical disk medium of the detected type.

As mentioned above, since there is provided information about an estimated reproduction signal quality of the recorded data, the user can beforehand understand the estimated reproduction signal quality of the data to be recorded on the optical disk. Accordingly, it becomes unnecessary to find an undesirable reproduction signal quality after recording and re-record data on another medium, or to purchase a plurality of media for selecting a proper medium capable of recording music data with good sound quality, as conventionally practiced. That is to say, the present invention is very profitable to users.

Figures 12A, 12B:
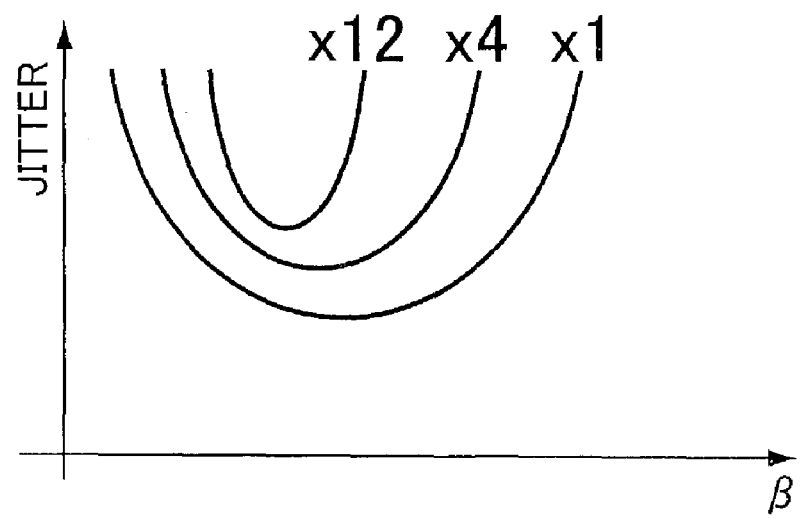
FIGS. 12(A) and 12(B) exemplify estimated reproduction signal qualities of optical disks to be indicated on the display of the optical disk recording apparatus.

FIG. 12 exemplifies estimated reproduction signal qualities of optical disks to be indicated on the display section of the optical disk recording apparatus. As shown in FIG. 12(A), for example, a table may be used to provide users with estimated reproduction signal qualities corresponding to recording speeds. As shown in FIG. 12(B), a graph may be used to indicate estimated reproduction signal qualities by presenting relationship between a $\beta$ value and a jitter using a recording speed as the parameter.

A computer equipped with an optical disk drive can provide the optical disk recording apparatus 1 operating as mentioned above according to the sixth embodiment of the present invention. That is to say, an MPU and its peripheral circuits composing the computer can provide the address detection circuit 14 and the system control section 16 as identification means for identifying recordable optical disk types. Further, memory, RAM, and ROM composing the computer can provide the storing section 26 as a storage means for storing an estimated reproduction signal quality when data is recorded on a recordable optical disk. In addition, a monitor composing the computer can provide the display section 28 as a display means for displaying an estimated reproduction signal quality of the recordable optical disk. In such a case, a computer program is provided for use in the optical recording apparatus having a CPU and being capable of writing data into an optical disk of various types under a given machine parameter relating to a reproduction signal quality of the written data, wherein the computer program is executable by the CPU for causing the optical recording apparatus to perform a process comprising the steps of storing a relation between the machine parameter and the reproduction signal quality, detecting a type of the optical disk medium to be used for writing of data, estimating the reproduction signal quality based on the stored relation between the machine parameter and the reproduction signal quality and the detected type of the optical disk medium before the writing of the data, and displaying the estimated reproduction signal quality which will be expected when the data is actually written into the optical disk medium of the detected type.

As an estimated reproduction signal quality, it may be preferable to use a result of determining the reproduction signal quality of test write data for the OPC. Namely, the inventive optical recording apparatus may comprise a writing section capable of writing data into an optical disk of various types with a certain reproduction signal quality of the written data, a test section that enables the writing section to conduct provisional writing of test data into the optical disk medium and that measures a reproduction signal quality of the written test data, a detecting section that detects a type of the optical disk medium subjected to the provisional writing of the test data, an estimating section operable before the writing of the data for estimating the reproduction signal quality based on the measured reproduction signal quality of the test data and the detected type of the optical disk medium, and a display section that displays the estimated reproduction signal quality which will be expected when the data is actually written into the detected type of the optical disk medium.

It is a good practice to previously store the computer program for operating the above-mentioned parts in the storing section 26 and read and execute the program in response to a user action on the operating section 27.

When a new recordable optical disk has come to market, a user may want to obtain up-to-date information about that optical disk. In such a case, it may be preferable to use a communication means (not shown) and update the firmware via the Internet.

A seventh embodiment of the present invention will now be described. The optical disk recording apparatus according to the seventh embodiment of the present invention uses the storing section to store signal quality parameters for the reproduction signal quality for data that was recorded in the past. When recording data on an optical disk, a user can call the past data and record it.

A more detailed description follows. For example, a user himself or herself adjusted the data record setting in the past and successfully recorded music data on an optical disk "a" with very satisfactory sound quality. The user may want to record music data on the optical disk "a" with the same setting. In other words, the user may want to change a copy origin disk depending on data to be recorded and the reproduction signal quality. Further, the use may want to perform a conditional search using a specified reproduction signal quality value and set signal quality parameters concerning the reproduction signal quality based on a search result. In these cases, if the user can get information about signal quality parameters concerning the reproduction signal quality for data recording on optical disks in the past, the user can easily set signal quality parameters concerning the reproduction signal quality and record data on a recordable optical disk.

The optical disk recording apparatus according to the seventh embodiment of the present invention uses the storing section 26 to store signal quality parameters concerning the reproduction signal quality that were specified during data recording on optical disks in the past. When data is to be recorded on another optical disk, the apparatus uses the display section 28 to display the signal quality parameters concerning the reproduction signal quality stored in the storing section 26. A user can operate the operating section 27 to choose from the signal quality parameters concerning the reproduction signal quality displayed on the display section 28. When the user operates the operating section 27 to select a given parameter, the system control section 16 sets the selected parameter to a value of the signal quality parameter concerning the reproduction signal quality stored in the storing section 26. The system control section 16 outputs specified signals to the servo circuit 13, the laser power control circuit 20, the encoder 17, and the strategy circuit 18. The system control section 16 allows the optical pickup 10 to irradiate an laser beam to record data on a recordable optical disk mounted on the spindle motor. Namely, the inventive optical recording apparatus is designed for recording data into an optical disk medium with a certain reproduction signal quality. The inventive optical recording apparatus comprises a storing section that stores a plurality of quality parameters which have been used for recording data in the past, and which represent the reproduction signal qualities of the data recorded in the past, a display section that displays the stored quality parameters, a selecting section that selects one of the displayed quality parameters, a setting section that sets a machine parameter relating to the reproduction signal quality in accordance with the selected quality parameter, and a writing section operable under the set machine parameter for recording the data into the optical disk medium.

As mentioned above, there is provided information about signal quality parameters concerning the reproduction signal quality recorded in the past. Without this function, the user needs to take a note about how he or she set signal quality parameters concerning the reproduction signal quality. When recording data again with the same setting, the user needs to review the memo. The present invention eliminates the need for such complicated works.

When the optical disk recording apparatus needs to store the setting of signal quality parameters concerning the reproduction signal quality, the display section of the apparatus displays whether or not to reserve that setting after completion of the data recording. The user can follow an instruction and enter, e.g., the contents of a memorandum by operating the selecting section. Before recording data on an optical disk, it may be preferable to operate the selecting section to call an intended setting of signal quality parameters concerning the reproduction signal quality stored in the optical disk recording apparatus.

A computer equipped with an optical disk drive can provide the optical disk recording apparatus 1 operating as mentioned above according to the seventh embodiment of the present invention. Further, memory, RAM, and ROM composing the computer can provide the storing section 26 as a storage means for storing signal quality parameters concerning the reproduction signal quality specified for data recording on optical disks in the past. In addition, a monitor composing the computer can provide the display section 28 as a display means for displaying signal quality parameters concerning the reproduction signal quality stored in the storing section 26. A keyboard and a mouse can provide the operating section 27 as an operation means for selecting signal quality parameters concerning the reproduction signal quality displayed on the display section 28. An MPU and its peripheral circuits composing the computer can provide the system control section 16 as a reproduction signal quality adjustment means for supplying values stored in the storing section 26 to signal quality parameters concerning the reproduction signal quality.

In the above case, a computer program is designed for use in the optical recording apparatus having a CPU for recording data into an optical disk medium with a certain reproduction signal quality, wherein the computer program is executable by the CPU for causing the optical recording apparatus to perform a process comprising the steps of storing quality parameters which were used for recording data in the past and which represent the reproduction signal qualities of the data recorded in the past, displaying the stored quality parameters, selecting one of the displayed quality parameters, setting a machine parameter relating to the reproduction signal quality in accordance with the selected quality parameter, and recording the data into the optical disk medium under the set machine parameter. It is a good practice to previously store the computer program for operating the above-mentioned parts in the storing section 26 and read and execute the program in response to a user action on the operating section 27.

In the above-mentioned embodiments, it may be preferable to provide setting data for each optical disk (medium) type or recording speed type.

The present invention is applicable not only to the CLV and CAV systems, but also to the partial CAV system and the other recording systems.

The present invention can reproduce music data with almost the same sound quality as that for a source optical disk without causing a conventional problem of reproducing a different sound quality due to a different reproduction signal quality. It is possible to easily adjust the reproduction signal quality just by setting signal quality parameters concerning reproduction signal quality. Further, a reproduction signal quality can be configured to any value and users can obtain data with an intended reproduction signal quality. In addition, it is possible to provide high-quality recording data corresponding to data types.

When original data is music data, the sound quality can be configured to differ from that of the original data, making new audibility available. Further, data can be optimally recorded in accordance with types of data to be recorded. In addition, it is possible to grasp the reproduction signal quality of data recorded on an optical disk and an estimated reproduction signal quality of data to be recorded on a recordable optical disk. Accordingly, depending on the reproduction signal quality, a better reproduction signal quality can be obtained by replacing the optical disk with a different one. When the reproduction signal quality was configured during data recording on optical disks, that quality can be read and reused for easily recording data on a recordable optical disk.

What is claimed is:

1. A method of recording data onto a recordable optical disk, the method comprising:
   providing a relationship between a signal quality of a reproduced signal of data recorded on an optical disk and a parameter related to the signal quality, said reproduced signal being the signal that is generated when the recorded data is reproduced;
   reproducing original data originally recorded on a source optical disk;
   measuring a signal quality of the signal of the reproduced original data during reproduction;
   setting a parameter according to the measured signal quality based on the provided relationship; and
   copying the original data onto a recordable optical disk based on the set parameter such that the signal quality of the data copied onto the recordable optical disk is substantially the same as the signal quality of the original data.

2. A method of writing data, originally recorded in a source disk medium with an original signal quality, into an object disk medium by means of an optical recording apparatus having a machine parameter settable to control a signal quality of the signal of the written data to be reproduced from the object disk medium, said original signal quality being the quality of the signal of the data to be reproduced from the source disk medium, the method comprising:
   measuring the original signal quality of the data in the source disk medium during reproduction;
   setting a value of the machine parameter of the optical recording apparatus in accordance with the measured original signal quality; and
   writing the data into the object disk medium by means of the optical recording apparatus so as to secure the signal quality of the written data comparable to the original signal quality.

3. A method of writing data, originally recorded in a source disk medium with an original signal quality, into an object disk medium by means of an optical recording apparatus having a machine parameter settable to control a signal quality of the signal of the written data to be reproduced from the object disk medium, said original signal quality being the quality of the signal of the data to be reproduced from the source disk medium, the method comprising:
   storing a relationship between a machine parameter settable to the optical recording apparatus and a signal quality of the reproduced signal that is generated when the data written by the optical recording apparatus is reproduced;
   measuring the original signal quality of the data in the source disk medium during reproduction;
   setting a value of the machine parameter of the optical recording apparatus according to the measured original signal quality based on the stored relationship and
   writing the data into the object disk medium by means of the optical recording apparatus with the set machine parameter so as to secure the signal quality of the written data comparable to the original signal quality.

4. The method according to claim 3, wherein the storing includes storing a plurality of the relationships in correspondence to various types of source disk medium, and the method further includes detecting the type of the source disk medium to be used for writing of data, so that the value of the machine parameter of the optical recording apparatus in matching with the measured original signal quality is set based on a particular one of the stored relationships corresponding to the detected type of the source disk medium.

5. A method of writing data, originally recorded in a source disk medium with an original signal quality, into an object disk medium by means of an optical recording apparatus having a machine parameter settable to control a signal quality of the signal of the written data to be reproduced from the object disk medium, said original signal quality being the quality of the signal of the data to be reproduced from the source disk medium, the method comprising:
   conducting a provisional write of test data into the object disk medium by means of the optical recording apparatus, an analysis of a signal quality of a reproduced signal generated by reproducing the test data written in the object disk medium, and a determination of a relationship between the analyzed reproduced signal quality and the machine parameter of the optical recording apparatus used in the provisional write;
   measuring the original signal quality of the data in the source disk medium during reproduction;
   setting a value of the machine parameter of the optical recording apparatus according to the measured original signal quality based on the determined relationship; and
   writing the data into the object disk medium by means of the optical recording apparatus with the set machine parameter so as to secure the signal quality of the written data comparable to the original signal quality.

6. An optical recording apparatus for recording data onto a recordable optical disk, the optical recording apparatus comprising:
   a providing section that provides a relationship between a signal quality of a reproduced signal of data recorded on an optical disk and a parameter related to the signal quality, said reproduced signal being the signal that is generated when the recorded data is reproduced;
   a reproduction section that reproduces original data originally recorded on a source optical disk;
   a measuring section that measures a signal quality of the signal of the reproduced original data during reproduction;
   a setting section that sets a parameter according to the measured signal quality based on the provided relationship; and
   a writing section that copies the original data onto a recordable optical disk based on the set parameter such that the signal quality of the data copied onto the recordable optical disk is substantially the same as the signal quality of the original data.

7. An optical recording apparatus for writing data into an object disk medium under a machine parameter settable to control a signal quality of the signal of the written data to be reproduced from the object disk medium, wherein the data is originally recorded in a source disk medium with an original signal quality, said original signal quality being the quality of the signal of the data to be reproduced from the source disk medium, the optical recording apparatus comprising:

- a measuring section that measures the original signal quality of the data in the source disk medium during reproduction;
- a setting section that sets a value of the machine parameter in accordance with the measured original signal quality; and
- a writing section that writes the data into the object disk medium so as to secure the signal quality of the written data comparable to the original signal quality.

8. An optical recording apparatus for writing data into an object disk medium under a machine parameter settable to control a signal quality of the signal of the written data to be reproduced from the object disk medium, wherein the data is originally recorded in a source disk medium with an original signal quality, said original signal quality being the quality of the signal of the data to be reproduced from the source disk medium, the optical recording apparatus comprising:

- a storing section that stores a relationship between the machine parameter and a signal quality of the reproduced signal that is generated when the data written by the optical recording apparatus is reproduced;
- a measuring section that measures the original signal quality of the data in the source disk medium during reproduction;
- a setting section that sets a value of the machine parameter according to the measured original signal quality based on the relationship stored in the storing section; and
- a writing section that writes the data into the object disk medium under the set machine parameter so as to secure the signal quality of the written data comparable to the original signal quality.

9. The optical recording apparatus according to claim 8, wherein the storing section stores a plurality of relationships in correspondence to various types of source disk medium, the apparatus further including a detecting section for detecting the type of the source disk medium to be used for writing of data, so that the setting section sets the value of the machine parameter in matching with the measured original signal quality based on a particular one of the stored relationships corresponding to the detected type of the source disk medium.

10. An optical recording apparatus for writing data into an object disk medium under a machine parameter settable to control a signal quality of the signal of the written data to be reproduced from the object disk medium, wherein the data is originally recorded in a source disk medium with an original signal quality, said original signal quality being the quality of the signal of the data to be reproduced from the source disk medium, the optical recording apparatus comprising:

- a test section that conducts a provisional write of test data into the object disk medium, analyzes a signal quality of a reproduced signal generated by reproducing the test data written in the object disk medium, and determines a relationship between the analyzed reproduced signal quality and the machine parameter used in the provisional write;
- a measuring section that measures the original signal quality of the data in the source disk medium during reproduction;
- a setting section that sets a value of the machine parameter according to the measured original signal quality based on the relationship determined by the test section; and
- a writing section that writes the data into the object disk medium under the set machine parameter so as to secure the signal quality of the written data comparable to the original signal quality.

* * * * *